(12) United States Patent
Nakanishi

(10) Patent No.: US 7,675,457 B2
(45) Date of Patent: Mar. 9, 2010

(54) RADAR SYSTEM

(75) Inventor: Motoi Nakanishi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 175 days.

(21) Appl. No.: 10/577,795

(22) PCT Filed: Oct. 5, 2004

(86) PCT No.: PCT/JP2004/014636

§ 371 (c)(1),
(2), (4) Date: Sep. 24, 2008

(87) PCT Pub. No.: WO2005/050250

PCT Pub. Date: Jun. 2, 2005

(65) Prior Publication Data

US 2009/0009383 A1 Jan. 8, 2009

(30) Foreign Application Priority Data

Nov. 18, 2003 (JP) .............................. 2003-388347

(51) Int. Cl.
*G01S 13/42* (2006.01)
*G01S 13/34* (2006.01)
*G01S 13/00* (2006.01)
*G01S 13/93* (2006.01)

(52) U.S. Cl. .................... 342/133; 342/70; 342/118; 342/128; 342/146; 342/147; 342/158; 342/175; 342/195; 342/196

(58) Field of Classification Search .................... 342/27, 342/28, 70–72, 89–103, 118, 128–133, 146, 342/147, 158, 175, 195, 192–194, 196–197
See application file for complete search history.

(56) References Cited

U.S. PATENT DOCUMENTS 3,701,989 A * 10/1972 Calhoon et al. ............. 342/147

4,101,888 A * 7/1978 Heller et al. ................. 342/70
4,771,288 A * 9/1988 Johnson ...................... 342/147

(Continued)

FOREIGN PATENT DOCUMENTS

JP 11-337635 12/1999

(Continued)

OTHER PUBLICATIONS

Written Opinion Of The International Searching Authority dated Dec. 28, 2004.
International Search Report dated Nov. 18, 2003.

*Primary Examiner*—Bernarr E Gregory
(74) *Attorney, Agent, or Firm*—Dickstein Shapiro LLP

(57) ABSTRACT

A radar system transmits a beam of detection radio waves with a predetermined azimuth width, receives a reflected wave from a target, changes a central azimuth of the beam, and detects the distribution of reception signal strengths at predetermined angular intervals and for each predetermined distance. Then, when the reception signal strength distribution associated with changes in azimuth is expressed in rectangular coordinates, an azimuth corresponding to a vertex of an isosceles triangle that approximates the reception signal strength distribution and has an azimuth width, which is determined by the beam azimuth width, as its base is detected as the central azimuth of the target. Thus, the radar system becomes capable of detecting the azimuth of a target at a resolution capability higher than in the case where the movement of a target cannot be detected at a resolution equal to or less than the beam width of detection radio waves, and higher than in the case where a resolution in the azimuth direction is determined by the sampling interval in the azimuth direction. Moreover, the problem of deviation of the peak position of a reception signal strength from the center of a target can be solved.

20 Claims, 16 Drawing Sheets

U.S. PATENT DOCUMENTS

| | | | |
|---|---|---|---|
| 5,734,344 A * | 3/1998 | Yamada | 342/72 |
| 6,130,638 A * | 10/2000 | Winter et al. | 342/147 |
| 6,133,866 A * | 10/2000 | Kanter | 342/146 |
| 6,246,357 B1 * | 6/2001 | Uehara | 342/70 |
| 6,246,359 B1 * | 6/2001 | Asano et al. | 342/158 |
| 6,348,889 B1 * | 2/2002 | Ashihara et al. | 342/70 |
| 6,369,748 B1 * | 4/2002 | Uehara | 342/70 |
| 6,597,307 B2 | 7/2003 | Nakanishi et al. | |
| 6,680,687 B2 * | 1/2004 | Phelipot | 342/147 |
| 6,750,810 B2 * | 6/2004 | Shinoda et al. | 342/70 |
| 6,853,329 B2 * | 2/2005 | Shinoda et al. | 342/70 |
| 7,230,565 B2 * | 6/2007 | Nakanishi et al. | 342/70 |
| 2003/0052812 A1 * | 3/2003 | Phelipot | 342/195 |
| 2003/0112172 A1 * | 6/2003 | Shinoda et al. | 342/70 |
| 2003/0160718 A1 * | 8/2003 | Nagasaku | 342/70 |
| 2003/0164791 A1 * | 9/2003 | Shinoda et al. | 342/70 |
| 2004/0164892 A1 * | 8/2004 | Shinoda et al. | 342/70 |

FOREIGN PATENT DOCUMENTS

| | | |
|---|---|---|
| JP | 2000-338222 | 12/2000 |
| JP | 2002-014165 | 1/2002 |
| JP | 2002-257926 | 9/2002 |

* cited by examiner

DL1: RECEPTION SIGNAL FROM TARGET A
DL2: RECEPTION SIGNAL FROM TARGET B
DL3: COMPOSITE RECEPTION SIGNAL

RADAR SYSTEM

TECHNICAL FIELD

The present invention relates to a radar system for detecting a target such as a vehicle by using, for example, millimeter band radio waves.

BACKGROUND ART

A known radar system disclosed in Patent Document 1 is one that is installed in a vehicle, such as an automobile, and used for measuring the distance between vehicles and the like.

The radar system in Patent Document 1 causes a beam scanner to direct a beam to three directions. If the same target is detected in a plurality of different beam directions, the radar system calculates the angle of the target according to the strength of a reception signal in each direction. On the other hand, if the target is detected only in a single beam direction, the radar system determines that the angle of the target is equal to a preset angle.

Patent Document 1: Japanese Unexamined Patent Application Publication No. 2000-338222

DISCLOSURE OF INVENTION

Problems to be Solved by the Invention

However, the known in-vehicle radar system described above is not capable of tracking the movement of a target at a resolution equal to or less than the beam width of the detection radio waves. Moreover, in the observation of changes in reception signal strength according to changes in beam azimuth direction, the beam azimuth at which the reception signal strength reaches its peak does not necessarily indicate the exact center position of the target. In other words, the known in-vehicle radar system has a problem of low accuracy in measuring the azimuth of a target.

Even if, apart from the method described in Patent Document 1, a beam with a minimized width is used for scanning in the azimuth direction, the resolution in the azimuth direction is determined by the sampling interval in the azimuth direction.

Accordingly, an object of the present invention is to provide a radar system with enhanced performance in detecting the position of a target, the radar system being capable of detecting the azimuth of a target at a resolution capability higher than in the case where the movement of a target cannot be detected at a resolution equal to or less than the beam width of detection radio waves, and higher than in the case where a resolution in the azimuth direction is determined by the sampling interval in the azimuth direction, and being able to solve the problem where the peak position of a reception signal strength deviates from the center of a target.

Means for Solving the Problems

According to an aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target on the basis of a beam azimuth width and reception signal strengths at two azimuths that are a central-azimuth-detecting azimuth width away from each other and located on the left and right of an azimuth corresponding to a maximum value in the reception signal strength distribution within a distance to the target, the approximate isosceles triangle having the beam azimuth width as its base and having two points representing the reception signal strengths on its two oblique sides when the reception signal strength distribution associated with changes in azimuth is expressed in rectangular coordinates.

According to another aspect of the present invention, in the radar system, the target-central-azimuth detecting means further comprises means for defining a plurality of central-azimuth-detecting azimuth widths, detecting an azimuth corresponding to a vertex of an approximate isosceles triangle with respect to each of the central-azimuth-detecting azimuth widths, and performing weighted averaging on the detected azimuths.

According to another aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target on the basis of a beam azimuth width, a reception signal strength at an azimuth corresponding to a maximum value in the reception signal strength distribution within a distance to the target, and a higher reception signal strength of two reception signal strengths at two azimuths that are respectively separated by a central-azimuth-detecting azimuth width to the left and right sides from the azimuth corresponding to the maximum value, the approximate isosceles triangle having the beam azimuth width as its base and having two points representing the reception signal strengths on its two oblique sides when the reception signal strength distribution associated with changes in azimuth is expressed in rectangular coordinates.

According to another aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target on the basis of reception signal strengths at a plurality of azimuths that are predetermined central-azimuth-detecting azimuth widths away from and are located on the left and right sides of an azimuth corresponding to a maximum value in the reception signal strength distribution within a distance to the target, the approximate isosceles triangle having a plurality of points representing the reception signal strengths at the plurality of azimuths on its two oblique sides when the reception signal strength distribution associated with changes in azimuth is expressed in rectangular coordinates.

According to another aspect of the present invention, the radar system further includes a means for performing processing if the length of the base of the approximate isosceles triangle is smaller than the beam azimuth width of a main lobe of the beam, such that an azimuth corresponding to the vertex of the approximate isosceles triangle is not treated as a central azimuth of the target.

According to another aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target on the basis of a reception signal strength at an azimuth corresponding to a maximum value in the reception signal strength distribution within a distance to the target and also, on the basis of a lower reception signal strength of two reception signal strengths at two azimuths that are respectively separated by a central-azimuth-detecting azimuth width to the left and right sides from the azimuth corresponding to the maximum value or a plurality of reception signal strengths at a plurality of azimuths located on the same side as the azimuth corresponding to the lower reception signal strength, the approximate isosceles triangle having a plurality of points representing the reception signal strengths on one of its oblique sides and having the beam azimuth width as its base, when the reception signal strength distribution associated with changes in azimuth is expressed in rectangular coordinates.

According to another aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target on the basis of a reception signal strength at an azimuth corresponding to a maximum value in the reception signal strength distribution within a distance to the target and one or a plurality of reception signal strengths at one or a plurality of azimuths that are one or a plurality of central-azimuth-detecting azimuth widths inside (left or right) the azimuth corresponding to the maximum value, the approximate isosceles triangle having a plurality of points representing the reception signal strengths on one of its oblique sides and having the beam azimuth width as its base when the reception signal strength distribution associated with changes in azimuth is expressed in rectangular coordinates.

According to another aspect of the present invention, a radar system includes a reception-signal-strength-distribution detecting means for transmitting a beam of detection radio waves having a predetermined azimuth width extending from the left to the right of a predetermined azimuth at the center, receiving a reflected wave from a target, changing a central azimuth of the beam, and detecting the distribution of reception signal strengths at predetermined angular intervals and for each predetermined distance; and a target-central-azimuth detecting means for detecting an azimuth corresponding to a vertex of an approximate isosceles triangle as a central azimuth of the target, if an azimuth at which a reception signal reaches its maximum value is located at an end (left or right) of a detection azimuth angle range, and if the condition that the ratio of an azimuth width obtained by subtracting a central-azimuth-detecting azimuth width from half the beam azimuth width to half the beam azimuth width is smaller than the ratio of a reception signal strength at an azimuth that is a central-azimuth-detecting azimuth width inside (left or right) an outermost azimuth corresponding to a maximum value in the reception signal strength distribution within a distance to the target to the outermost azimuth corresponding to the maximum value is satisfied, on the basis of the signal strength at the outermost azimuth corresponding to the maximum value, the reception signal strength at the azimuth that is a central-azimuth-detecting azimuth width inside the outermost azimuth, and the beam azimuth width, the approximate isosceles triangle having the beam azimuth width as its base and having two points representing the reception signal strengths on its two oblique sides when the reception signal strength distribution associated with changes in azimuth is expressed in rectangular coordinates, and if the above-described condition is not satisfied, on the basis of a reception signal strength at an azimuth corresponding to a maximum value in the reception signal strength distribution within a distance to the target and one or a plurality of reception signal strengths at one or a plurality of azimuths that are one or a plurality of central-azimuth-detecting azimuth widths inside (left or right) the azimuth corresponding to the maximum value, the approximate isosceles triangle having a plurality of points representing the reception signal strengths on one of its oblique sides and having the beam azimuth width as its base when the reception signal strength distribution associated with changes in azimuth is expressed in rectangular coordinates.

According to another aspect of the present invention, the radar system further includes a reception-signal-strength-distribution correcting means for subtracting, if the reception signal strength distribution within a distance to the target extends further than the beam azimuth width in the azimuth direction, a distribution corresponding to the isosceles triangle having the azimuth of the target detected by the target-central-azimuth detecting means as its vertex and having the beam azimuth width as its base from the reception signal strength distribution.

According to another aspect of the present invention, in the radar system, the reception-signal-strength-distribution correcting means sequentially subtracts a distribution for the isosceles triangle corresponding to a target whose central azimuth is detected from the reception signal strength distribution.

According to another aspect of the present invention, in the radar system, the reception-signal-strength-distribution detecting means varies the central azimuth of the beam within a detection azimuth angle range, and the target-central-azimuth detecting means further comprises means for varying the central-azimuth-detecting azimuth width according to an azimuth corresponding to a maximum value in the reception signal strength distribution within a distance to the target.

Advantageous Effect of the Invention

According to an aspect of the present invention, a reception-signal-strength-distribution detecting means detects the distribution of reception signal strengths at predetermined angular intervals and for each predetermined distance, and a target-central-azimuth detecting means detects the azimuth of a target on the basis of a beam azimuth width and reception signal strengths at two azimuths that are a central-azimuth-detecting azimuth width away from each other and located on the left and right of an azimuth corresponding to a maximum value in the reception signal strength distribution within a distance to the target. When the azimuth of the target and the reception signal strength distribution obtained from beam scanning are expressed in rectangular coordinates where the reception signal strength distribution associated with changes in azimuth is shown, the reception signal strength distribution is approximated by the shape of an isosceles triangle having an azimuth width, which is determined by the beam azimuth width, as its base. Therefore, the azimuth of the target can be detected at a resolution capability higher than in the case where the movement of a target cannot be detected at a resolution equal to or less than the beam width of detection radio waves, and higher than in the case where a resolution in the azimuth direction is determined by the sampling interval in the azimuth direction.

According to another aspect of the present invention, a plurality of central-azimuth-detecting azimuth widths are defined and weighted averaging is performed on target's central azimuths detected with respect to these central-azimuth-detecting azimuth widths. Therefore, the central azimuth of the target can be detected with a high degree of precision according to the shape of the reception signal strength distribution.

According to another aspect of the present invention, a reception-signal-strength-distribution detecting means detects the distribution of reception signal strengths at predetermined angular intervals and for each predetermined distance, and a target-central-azimuth detecting means detects the azimuth of a target on the basis of a beam azimuth width, a reception signal strength at an azimuth corresponding to a maximum value in the reception signal strength distribution within a distance to the target, and a higher reception signal strength of two reception signal strengths at two azimuths that are respectively separated by a central-azimuth-detecting azimuth width to the left and right sides from the azimuth corresponding to the maximum value. Therefore, the azimuth of the target can be detected with particular importance given to reception signal strengths represented by the top end of a bell-shaped curve appearing in the reception signal strength distribution.

According to another aspect of the present invention, a vertex of an approximate isosceles triangle having a plurality of points on its two oblique sides can be detected as a central azimuth of the target, the plurality of points each representing a reception signal strength in the reception signal strength distribution associated with changes in azimuth. Thus, from the plurality of points in the reception signal strength distribution, the central azimuth of the target can be detected accurately.

According to another aspect of the present invention, when the reception signal strength distribution is approximated by the approximate isosceles triangle having points representing reception signal strengths in the reception signal strength distribution on its two oblique sides, if the length of the base of the approximate isosceles triangle is smaller than the azimuth width of a main lobe of the beam, processing is performed such that an azimuth corresponding to the vertex of the approximate isosceles triangle is not treated as a central azimuth of the target. Erroneous detection in which the central azimuth of the target is detected from the reception signal strength distribution corresponding to a side lobe can thus be prevented.

According to another aspect of the present invention, a vertex of an approximate isosceles triangle having a plurality of points on one of its oblique sides can be detected as a central azimuth of the target, the plurality of points each representing a reception signal strength in the reception signal strength distribution associated with changes in azimuth. Thus, from the plurality of points in the reception signal strength distribution, the central azimuth of the target can be detected accurately.

According to another aspect of the present invention, when the shape of the reception signal strength distribution is approximated by an isosceles triangle on the basis of reception signal strengths at a plurality of azimuths that are predetermined peak-detecting azimuth widths away from and are located on the left or right sides of an azimuth corresponding to a maximum value in the reception signal strength distribution, an azimuth corresponding to a vertex of the isosceles triangle is detected as a central azimuth of the target. Therefore, the central azimuth of the target can be detected even if a bell-shaped pattern appearing in the reception signal strength distribution generated from a reflected wave from the target is present in either end of the detection angle range. Thus, the central azimuth of the target can be detected over substantially the entire angular range within the detection azimuth angle range.

According to another aspect of the present invention, even if an azimuth corresponding to the maximum value of the reception signal is located at an end (left or right) of the detection azimuth angle range, if signal strengths at azimuths that are central-azimuth-detecting azimuth widths inside the azimuth corresponding to the maximum value can be regarded as points on two oblique sides of an isosceles triangle, an azimuth corresponding to the vertex of the isosceles triangle having the two points representing the reception signal strengths on its two oblique sides can be detected as a central azimuth of the target. The central azimuth of the target can thus be detected accurately, even if it is near an end of the detection azimuth angle range.

According to another aspect of the present invention, if two targets are closely located in the azimuth direction with a distance smaller than the beam azimuth width, a reception signal strength distribution corresponding to reflected waves from these targets has two bell shaped patterns that partially overlap. In the present invention, if the reception signal strength distribution extends in the azimuth direction further than the beam azimuth width, a distribution for the isosceles triangle corresponding to a target located at an azimuth obtained from reception signal strengths represented by points on one of the oblique sides is subtracted from the reception signal strength distribution. A reception signal strength distribution generated from the other target can thus be extracted. Therefore, even if two targets are closely located with a distance smaller than the beam azimuth width, the central azimuth of each target can be detected.

According to another aspect of the present invention, the reception-signal-strength-distribution detecting means varies the central azimuth of the beam within the detection azimuth angle range, while the target-central-azimuth detecting means varies the peak-detecting azimuth width depending on the central azimuth within the detection azimuth angle range. Therefore, even if the azimuth width of the beam is changed in response to changes in the central azimuth of the beam, the central azimuth of the target can be detected with a high degree of accuracy.

REFERENCE NUMERALS

IL approximate isosceles triangle
IB base of approximate isosceles triangle (azimuth width)
IH height of approximate isosceles triangle
Td vertex azimuth of proximate isosceles triangle (central azimuth of target)
DL reception signal strength distribution
DW central-azimuth-detecting azimuth width
IS oblique side of approximate isosceles triangle

BEST MODE FOR CARRYING OUT THE INVENTION

The radar system of the first embodiment will now be described with reference to FIG. 1 to FIG. 8.

Figure 1:
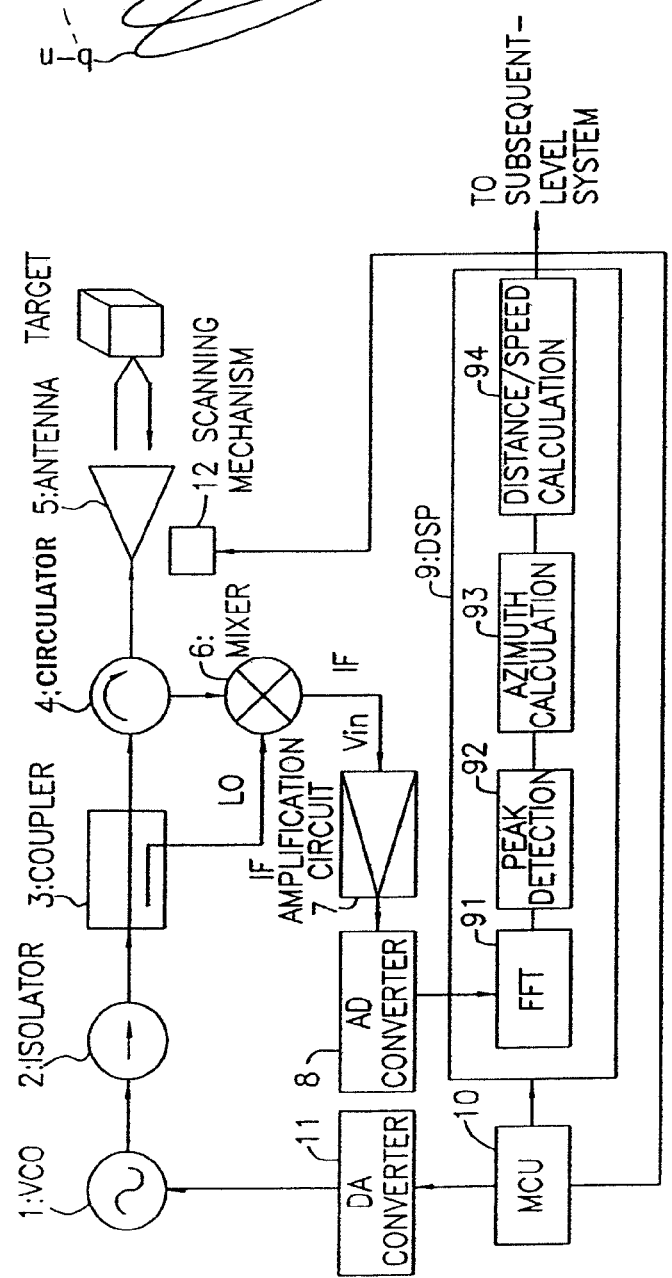
FIG. 1 is a block diagram showing the structure of a signal system of a radar system according to a first embodiment.

FIG. 1 is a block diagram showing the overall structure of the radar system. A VCO 1 varies the oscillation frequency according to a control voltage output from a DA converter 11. An isolator 2 transmits an oscillation signal from the VCO 1 to a coupler 3 so as to block a reflected signal from entering the VCO 1. While transmitting the signal via the isolator 2 to a circulator 4, the coupler 3 transmits a part of the transmitting signal, at a predetermined ratio, to a mixer 6 as a local signal Lo. The circulator 4 transmits the transmitting signal to an antenna 5, while supplying a reception signal from the antenna 5 to the mixer 6. The antenna 5 transmits a millimeter-wave beam of frequency-modulated continuous waves from the VCO 1 to a particular direction, and receives a reflected signal therefrom. Moreover, the antenna 5 periodically changes the direction of the beam over a detection angle range.

The mixer 6 mixes the local signal Lo from the coupler 3 with the reception signal from the circulator 4 to output an intermediate frequency signal IF. An IF amplification circuit 7 amplifies the intermediate frequency signal by a predetermined gain according to the distance. An AD converter 8 converts the amplified voltage signal to digital data and supplies the digital data to a DSP 9. Upon receipt of the digital data from the AD converter 8, the DSP 9 temporality stores digital data corresponding to at least one scan (i.e., scanning with a plurality of beams within the predetermined detection angle range). Then, according to processing described below, the DSP 9 calculates the azimuth of a target from the antenna, the distance to the target from the antenna, and the relative speed of the target with respect to the antenna. A microcontroller unit (MCU) 10 sequentially supplies modulation data for the VCO 1 to a D/A converter 11 so as to frequency-modulate the oscillation frequency of the VCO 1 with a continuous triangular wave. Moreover, the MCU 10 performs processing on a scanning mechanism 12 to change the direction of the antenna 5. Furthermore, the MCU 10 supplies, to the DSP 9, data that describes the timing of a modulation signal to the VCO 1 and the direction and azimuth of the antenna 5.

The DSP 9 includes an FFT processor 91 that receives digital data generated by the AD converter 8 and determines the frequency spectrum; a peak detection processor 92 for detecting, from the frequency spectrum, a peak position on the frequency axis; an azimuth calculation processor 93 for detecting the central azimuth of the detected target; and a processor 94 for calculating the distance to the target and the relative speed of the target.

Figure 2:
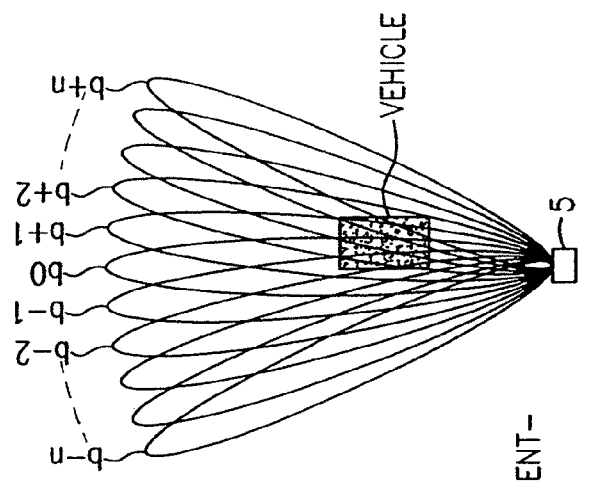
FIG. 2 illustrates the positional relationship of an antenna, beams, and a target.

FIG. 2 illustrates the positional relationship of a vehicle being a target, an antenna, and beams. Reference numerals b−n, . . . , b0, . . . , and b+n each denote a beam of detection waves from the antenna 5. Beam scanning is achieved by changing the direction of the antenna 5 over the detection angle range.

Figure 3:
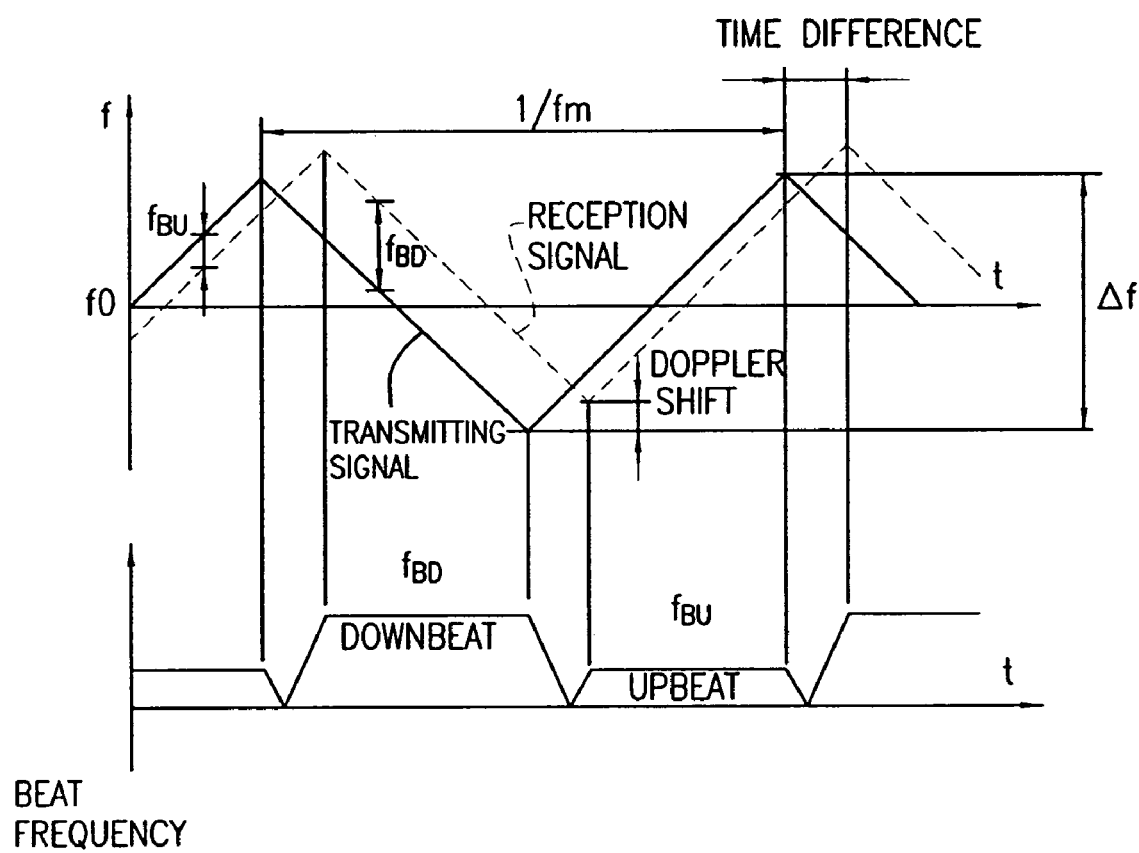
FIG. 3 illustrates an example of a frequency difference between beat signals generated in an up-modulating period and a down-modulating period of the radar system.

FIG. 3 illustrates an example of the difference in frequency change between a transmitting signal and a reception signal, the difference being caused by the distance to a target and the relative speed of the target. An upbeat frequency fBU represents a frequency difference between the transmitting signal and the reception signal in a frequency rising mode of the transmitting signal, a downbeat frequency fBD represents a frequency difference between the transmitting signal and the reception signal in a frequency dropping mode of the transmitting signal, and Δf denotes a frequency shift width. A shift along the time axis (time difference) between the triangular waves of the transmitting signal and reception signal corresponds to time necessary for radio waves to go to the target and return to the antenna. A shift along the frequency axis between the transmitting signal and the reception signal corresponds to the amount of Doppler shift, which is caused by the relative speed of the target with respect to the antenna. The time difference and the amount of Doppler shift change the values of the upbeat fBU and the downbeat fBD. In other words, detecting the frequencies of the upbeat and the downbeat gives the distance from the radar system to the target and the relative speed of the target with respect to the radar system.

Figure 4:
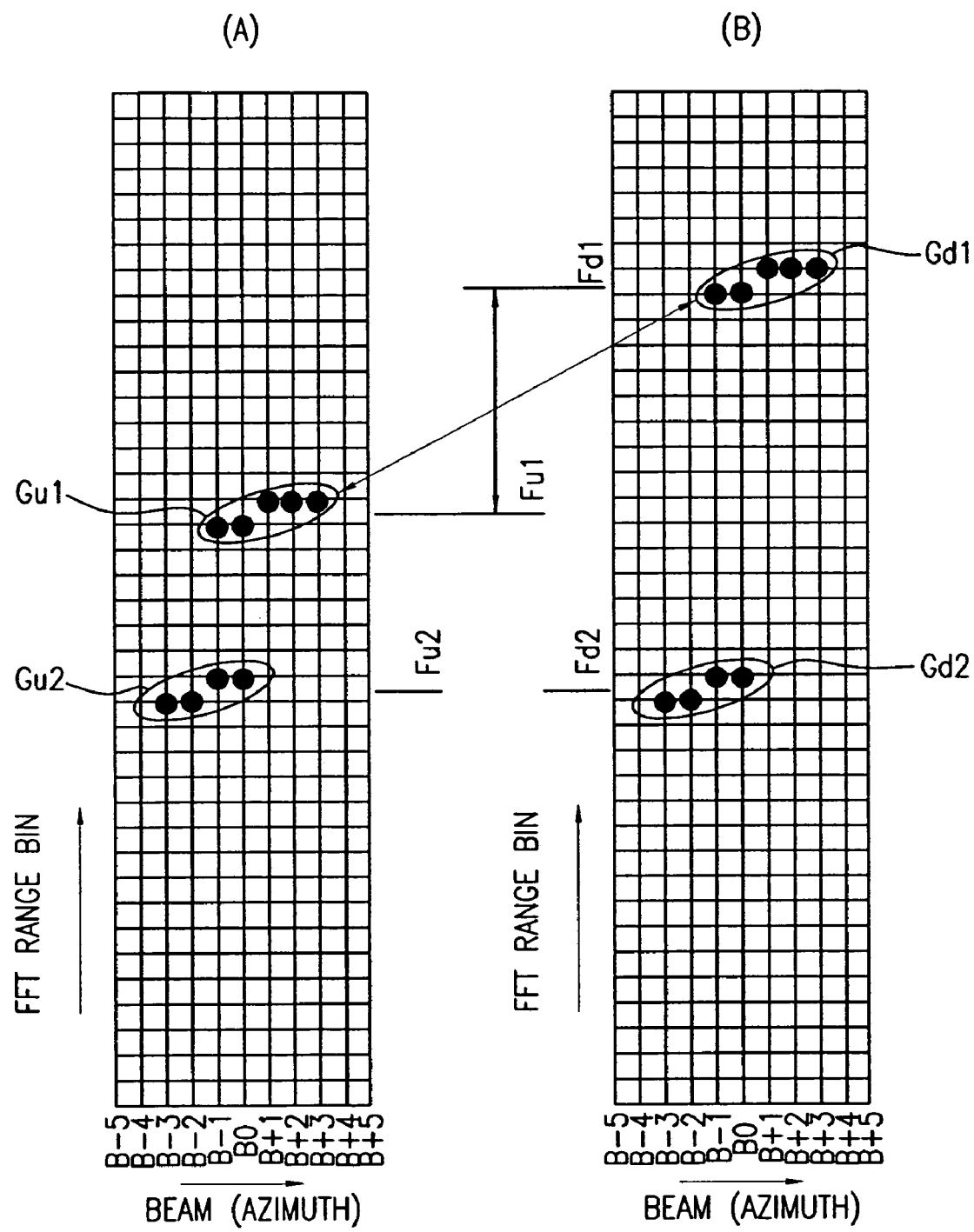
FIGS. 4(A) and 4(B) illustrate an example of signal strength distributions of peak groups in an azimuth direction.

FIG. 4 illustrates an example where frequency spectra for different azimuths are arranged in the azimuth direction. FIG. 4(A) illustrates peak frequencies in peaks appearing in the frequency spectra of beat signals in up-modulating periods of beams at different azimuths. FIG. 4(B) illustrates peak frequencies in peaks appearing in the frequency spectra of beat signals in down-modulating periods of beams at different azimuths. Beam azimuths are represented by the horizontal axis, while frequencies in peaks included in the frequency spectra are represented by the vertical axis and plotted in rectangular coordinates.

In this example, as in FIG. 4(A), a peak group Gu1 and a peak group Gu2 appear in the up-modulating period; each group includes peaks distributed in a particular form in the beam azimuth and the frequency direction. Similarly, as in FIG. 4(B), a peak group Gd1 and a peak group Gd2 appear in the down-modulating period; each group includes peaks distributed in a particular form in the beam azimuth and the frequency direction.

In FIG. 4, only the positions of the respective peaks included in the frequency spectra are indicated by black dots. The distribution of their strengths (reception signal strengths) is bell shaped in the azimuth direction.

Here, pairing is performed to determine which of the plurality of peak groups appearing in the up-modulating period is paired with which of the plurality of peak groups appearing in the down-modulating period. In other words, a determination is made as to whether two groups are generated by reflection from the same target.

Then, the distance to the target and the relative speed of the target are determined on the basis of the frequencies of the two groups to be paired in the up-modulating period and down-modulating period.

Figure 5:
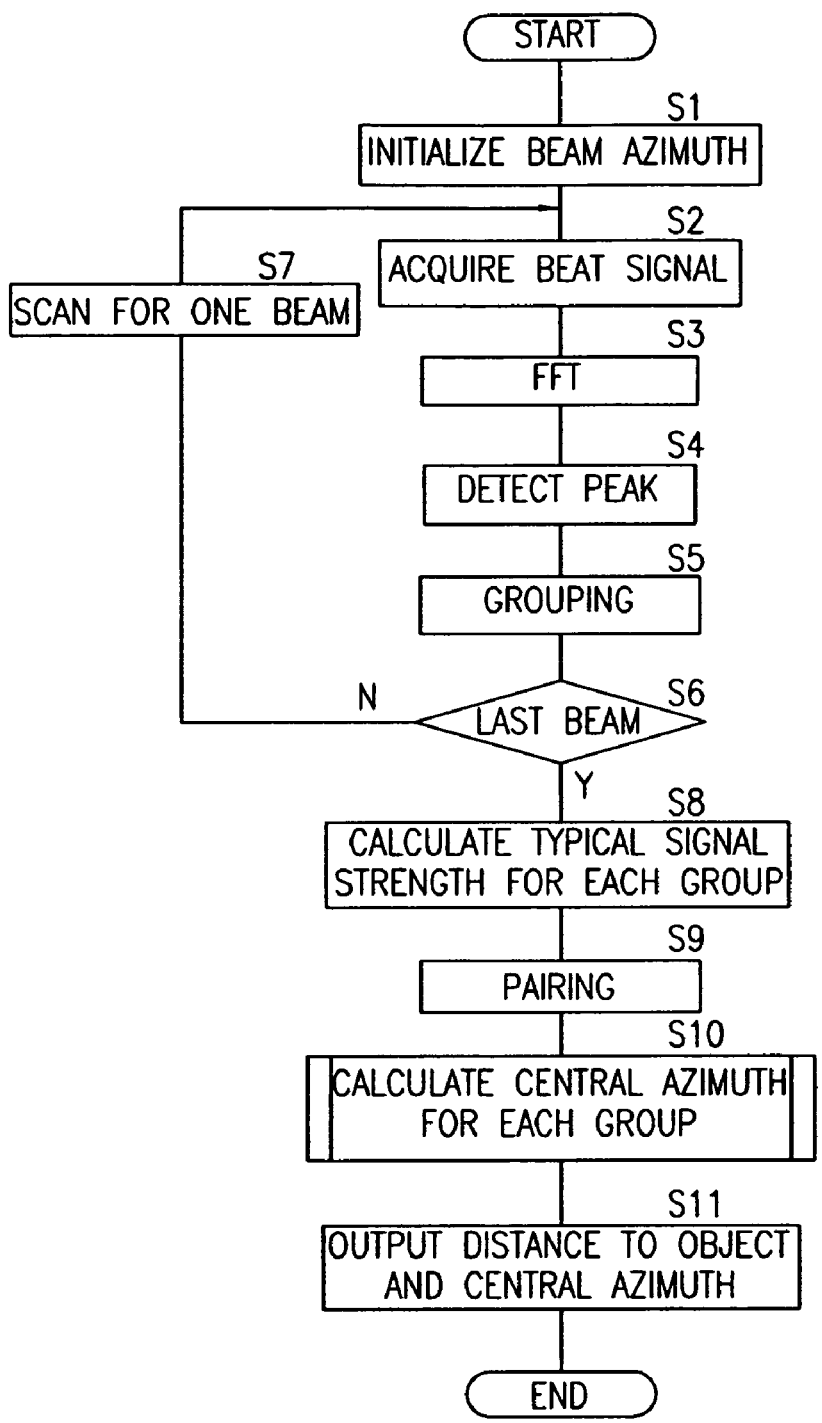
FIG. 5 is a flowchart showing a processing procedure of the radar system.

FIG. 5 is a flowchart showing a processing procedure of the DSP 9 and MCU 10 in FIG. 1. First, the scanning mechanism 12 performs control to direct a beam to an initial azimuth (S1). In this state, portions of beat-signal digital data generated by the A/D converter 8 are obtained as predetermined sampling counts and FFT is performed on the obtained data (S2→S3).

Next, a portion at which the signal strength in the frequency spectrum reaches its peak on the frequency axis is detected. Then, its peak frequency and signal strength at the peak frequency are extracted (S4).

Next, by referring to the extracted peak frequency and signal strength at the adjacent (previous) beam azimuth, a determination is made as to a group to which a peak frequency and its corresponding signal strength at the current beam azimuth are to be assigned (S5). In other words, those in which a difference between peak frequencies is within a predetermined range are grouped.

Then, after the beam azimuth is displaced by one beam, similar processing is performed (S6→S7→S2 → . . . )

By repeating the above-described processing until the last beam, a peak frequency spectrum for each beam azimuth in the up-modulating period and the down-modulating period is determined in a detection range with a predetermined width in the azimuth direction.

Next, a typical azimuth, a typical peak frequency, a typical signal strength, and a signal strength distribution in the azimuth direction are determined for each group (S8). For example, the central azimuth of a group extending in the beam azimuth direction and along the frequency axis is used as the typical azimuth, the center of a frequency range extending along the frequency axis at the typical azimuth is used as the typical peak frequency, and a signal strength at the typical peak frequency is used as the typical signal strength. Moreover, a change in signal strength in the azimuth direction at the typical peak frequency is calculated as reception signal strength distribution data.

Next, the central azimuth of each group is determined by the method described below (S10). Then, the distance to the target and data for the precisely determined central azimuth of the target are output to the subsequent-level system (S11).

Figure 7:
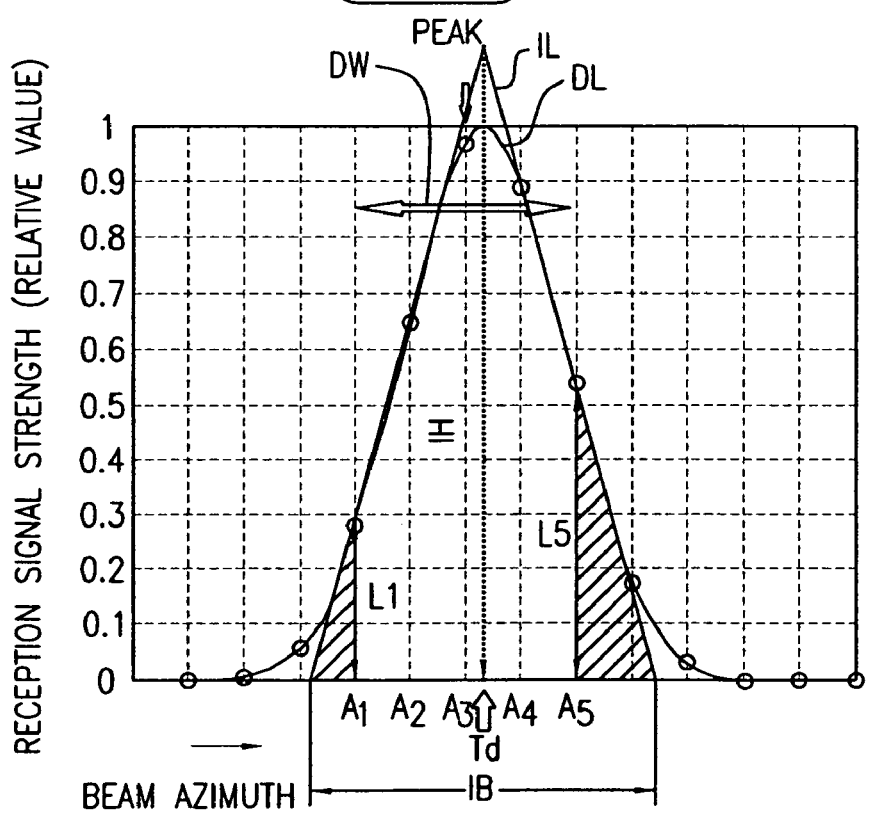
FIG. 7 illustrates a relationship between a reception signal strength distribution and an approximate isosceles triangle.

FIG. 7 illustrates an example of the distribution, in the beam azimuth direction, of reception signal strengths of an upbeat signal or a downbeat signal at a predetermined distance. The horizontal axis represents the beam central azimuth and particularly shows the range where the reception signal strength distribution curve is bell-shaped. The vertical axis represents the reception signal strengths normalized by defining the peak value of the reception signal strength as 1. Each circle in FIG. 7 indicates a reception signal strength at each beam azimuth. A curve DL that connects a plurality of points indicated by these circles represents the distribution of reception signal strengths in the azimuth direction. The reception signal strength distribution DL can be approximated by an isosceles triangle IL having an azimuth width IB as its base and a height IH. Hereinafter, this isosceles triangle IL is called approximate isosceles triangle. The azimuth width ID being the base of the approximate isosceles triangle IL is determined by the azimuth width of the target and the beam azimuth width at a given distance to the target. In other words, IB increases as the target width in the azimuth direction increases, and the IB also increases as the beam width in the azimuth direction increases. However, the possible range of the azimuth width of the target is limited. For example, the target to be detected by an in-vehicle millimeter wave radar is a vehicle. Therefore, the azimuth width IB being the base of the approximate isosceles triangle IL can be determined by the beam azimuth width at a given distance to the target.

At the same time, even if the sizes of targets are the same, the azimuth width of the target increases as the distance from the antenna of the radar system decreases, while the azimuth width of the target decreases as the distance from the antenna of the radar system increases. However, the possible range of the distance of the target to be detected is limited. For example, a vehicle more than 10 m away is often targeted for detection by an in-vehicle millimeter wave radar. Therefore, the azimuth width IB being the base of the approximate isosceles triangle IL takes a constant value determined by the beam azimuth width, regardless of the distance to the target.

The absolute value of a reception signal strength is proportional to the size and reflection coefficient of the target, and is inversely proportional to the square of the distance to the target. If reception signal strengths are normalized by defining the peak value as 1, the azimuth width IB being the base of the approximate isosceles triangle IL is determined only by the beam azimuth width. In FIG. 7, for easy viewing, the reception signal strength distribution DL is normalized by defining the peak value as 1.

Figure 6:
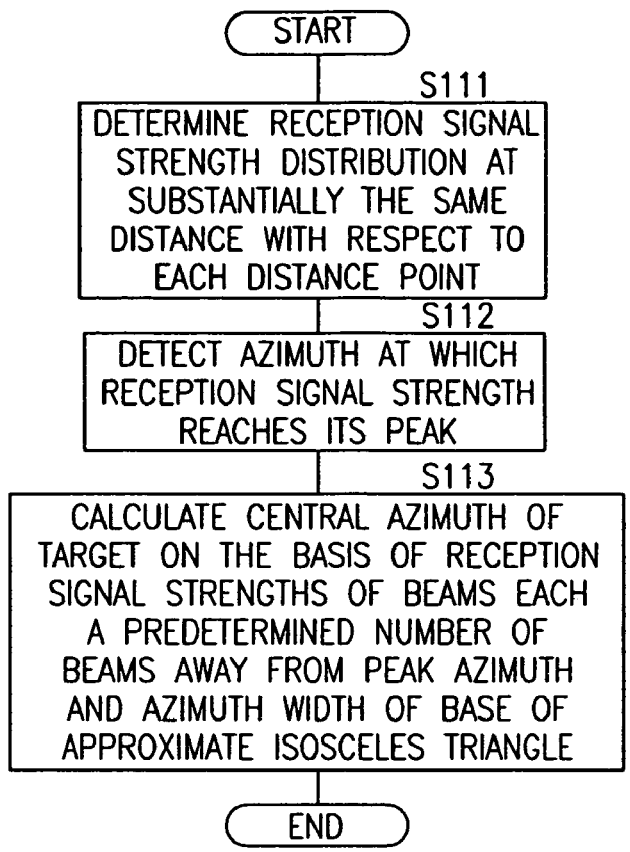
FIG. 6 is a flowchart showing a processing procedure in step S10 in FIG. 5.

FIG. 6 is a flowchart showing a processing procedure for detecting the central azimuth of the target in step S10 in FIG. 5. First, for each distance within the detectable distance range, the reception signal strength distribution at substantially the same distance is determined (S111). Next, the azimuth at which the reception signal strength reaches its peak is detected for each distance (S112). In the example shown in FIG. 7, a beam azimuth A3 at which the reception signal strength reaches its peak is detected. Then, the central azimuth of the target is calculated from the reception signal strengths of beams that are a predetermined number of beams away from the peak azimuth and the azimuth width being the base of the approximate isosceles triangle (S113). In the example shown in FIG. 7, the reception signal strengths L1 and L5 of beams that are a central-azimuth-detecting azimuth width DW (i.e., azimuth width for the detection of a central azimuth) away from the peak azimuth A3 are extracted, and a central azimuth Td of the approximate isosceles triangle IL is determined as the central azimuth of the target by using the equation described below.

In FIG. 7, the sum of the lengths of the bases of the two hatched right triangles with heights of L1 and L5 is equal to the difference obtained by subtracting the length corresponding to (A5−A1) from the base length IB of the approximate isosceles triangle. Since these triangles are similar and symmetrical with respect to the vertical axis, the base length of the right triangle with the height L1 is expressed as $\{IB-(A5-A1)\}L1/(L1+L5)$.

The central azimuth Td of the target is obtained by adding half the length of the base length IB of the approximate isosceles triangle to the difference obtained by subtracting the above-described base length from A1, and thus can be expressed as follows:

$$Td = A1 + IB/2 - \{(IB-A5+A1)L1\}/(L1+L5) \quad (1)$$

Substituting A1=−2.0°, A2=−1.0°, A3=0°, A4=1.0°, A5=2.0°, IB=6.2°, L1=0.27, and L5=0.51 into Equation (1) gives a target azimuth Td of 0.33°. Thus, the central azimuth of the target can be detected at a resolution capability higher than in the case where the movement of a target cannot be detected at a resolution equal to or less than the beam width of detection radio waves, and higher than in the case where a resolution in the azimuth direction is determined by the sampling interval in the azimuth direction.

Figure 8:
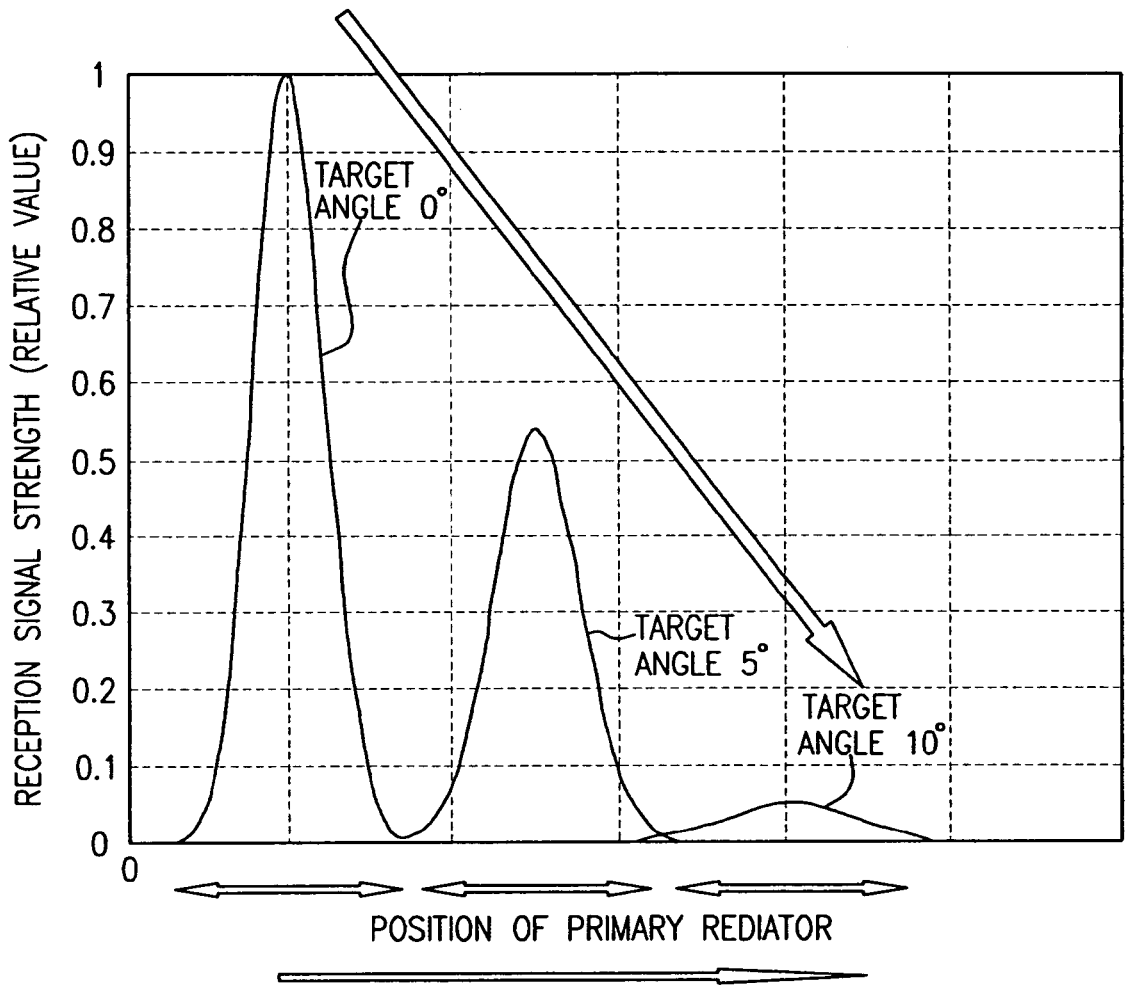
FIG. 8 illustrates an example of changes in the shape of a reception signal strength distribution according to beam azimuth.

FIG. 8 illustrates an example of changes in reception signal strength distribution when the beam azimuth is varied while the size of the target and the distance to the target are maintained. In FIG. 8, the horizontal axis represents the relative position of a primary radiator with respect to a dielectric lens. The primary radiator is moved, in the focal plane of the dielectric lens, along a curve or a straight line substantially orthogonal to the optical axis of the dielectric lens. As the primary radiator becomes distant from the optical axis, the beam width in the azimuth direction or the beam width in the direction orthogonal to the azimuth direction increases due to coma aberration of the dielectric lens. Therefore, as the beam azimuth becomes distant from the front of the primary radiator, the peak value of the reception signal strength relatively decreases as the beam width increases. Thus, when the beam azimuth width for determining the base (azimuth width) IB of the approximate isosceles triangle is varied according to the peak azimuth, an approximation to the isosceles triangle from the bell-shaped pattern appearing in the reception signal strength distribution (i.e., matching of the isosceles triangle with the bell-shaped pattern) can be made with a high degree of accuracy. Moreover, the central-azimuth-detecting azimuth width DW may be changed as necessary, according to the reception signal strength that changes depending on the beam azimuth.

The beam azimuth width and central-azimuth-detecting azimuth width DW for determining the base (azimuth width) IB of the approximate isosceles triangle may either be obtained by using equations or by referring to a table prepared in advance.

Next, a radar system of the second embodiment will be described with reference to FIG. 9 and FIG. 10.

A difference from the first embodiment is the process for detecting the central azimuth of the target. In the example shown in FIG. 7, the vertex azimuth of the approximate isosceles triangle is determined on the basis of the reception signal strengths of two beams that are a central-azimuth-detecting azimuth width DW away from each other, with the peak azimuth A3, which is obtained from the reception signal strength distribution, centered between the beams. However, in the example shown in FIG. 9, three central-azimuth-detecting azimuth widths DW1, DW2, and DW3, instead of the above-described single central-azimuth-detecting azimuth width DW, are given. Then, in every case, the central azimuth is detected on the basis of the reception signal strengths of beams that are their corresponding azimuth width away from the peak azimuth.

Figure 10:
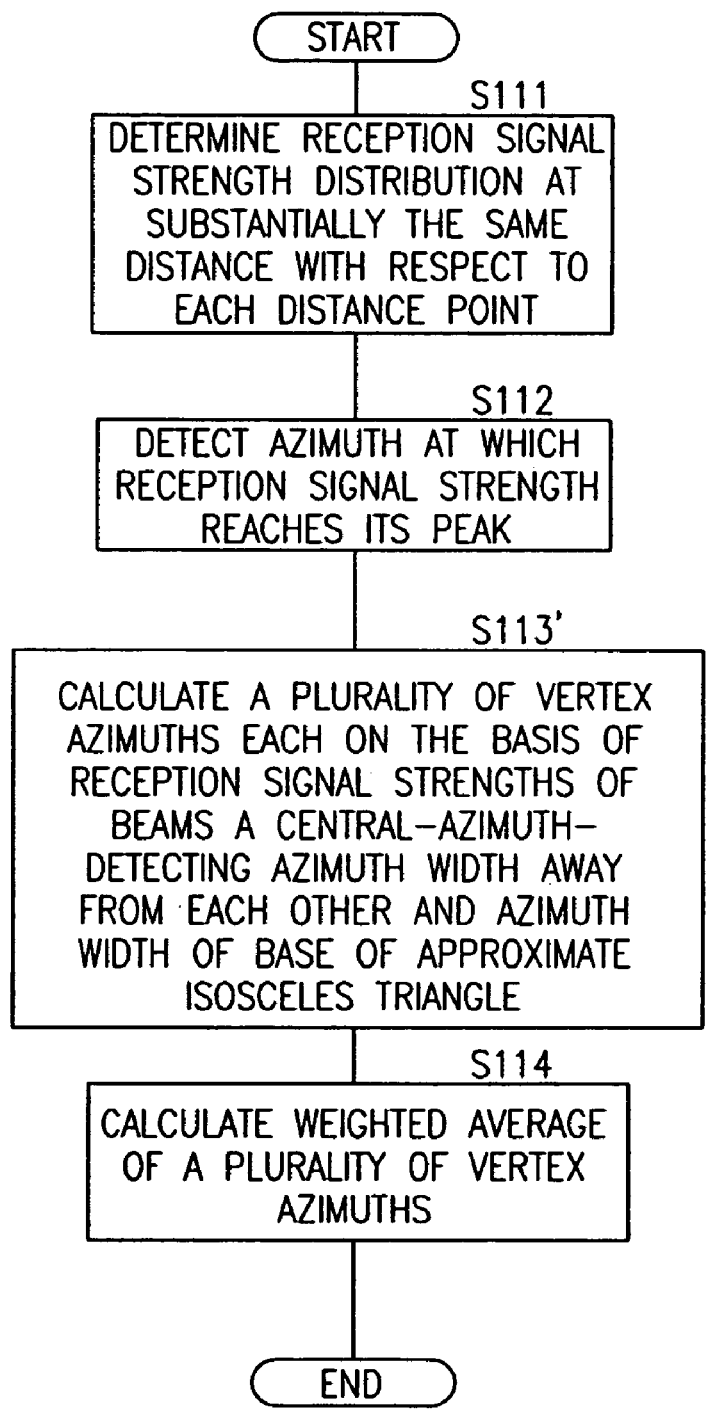
FIG. 10 is a flowchart showing a procedure of the target-central-azimuth detection.

FIG. 10 is a flowchart showing a processing procedure in step S10 in FIG. 5 of the first embodiment. First, for each distance within the detectable distance range, the reception signal strength distribution at substantially the same distance is determined (S111). Next, for each distance, the azimuth A3 at which the reception signal strength reaches its peak is detected (S112). Then, the three central-azimuth-detecting azimuth widths DW1, DW2, and DW3, instead of the above-described single central-azimuth-detecting azimuth width DW, are defined. Next, with respect to each of the central-azimuth-detecting azimuth widths DW1, DW2, and DW3, the reception signal strengths of beams that are their corresponding azimuth width away from the peak azimuth are determined. On the basis of the reception signal strengths determined as described above, the vertex azimuth of the approximate isosceles triangle is determined (S113'). Then, a value obtained by performing weighted averaging on vertex azimuths determined with respect to the central-azimuth-detecting azimuth widths DW1, DW2, and DW3 is detected as the central azimuth of the target.

Specifically, target central azimuths Td1, Td2, and Td3 corresponding to the respective central-azimuth-detecting azimuth widths DW1, DW2, and DW3 are determined on the basis of Equation (1). Then, performing weighted averaging on the central azimuths Td1, Td2, and Td3 finally gives the central azimuth of the target. Here, a smaller central-azimuth-detecting azimuth width means a higher accuracy in detecting the central azimuth, since the central azimuth is determined on the basis of the reception signal strength at or near the peak azimuth. That is, the central azimuth is determined by solving:

$$Td = (Wd1 \cdot Td1 + Wd2 \cdot Td2 + Wd3 \cdot Td3)/(Wd1 + Wd2 + Wd3) \quad (2)$$

where Wd1, Wd2, and Wd3 denote weights for weighted averaging of the respective central azimuths Td1, Td2, and Td3. These weights have the relation of Wd1>Wd2>Wd3.

Figure 9:
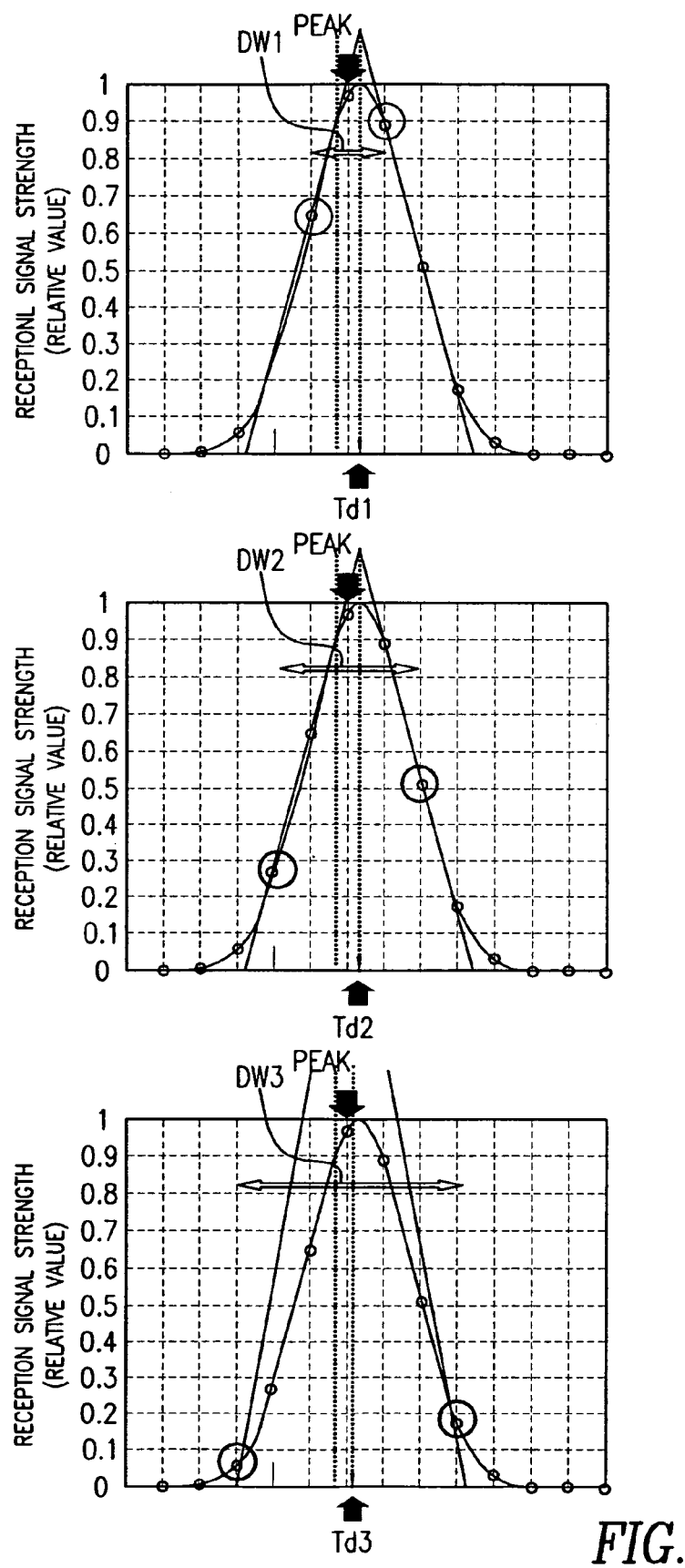
FIG. 9 illustrates a target-central-azimuth detecting method of a radar system according to a second embodiment.

Although three central-azimuth-detecting azimuth widths are given in the example shown in FIG. 9, the number of central-azimuth-detecting azimuth widths may further be increased. If matching of an approximate isosceles triangle with the reception signal strength distribution is to be performed with particular importance given to the overall shape of the reception signal strength distribution, weights for weighted averaging may be set such that more weights are added to the central azimuth based on reception signal strengths at beam azimuths that are away to a certain degree from the peak azimuth, while less weights are added as the central-azimuth-detecting azimuth width decreases or increases.

Next, a radar system of the third embodiment will be described with reference to FIG. 11.

Figure 11:
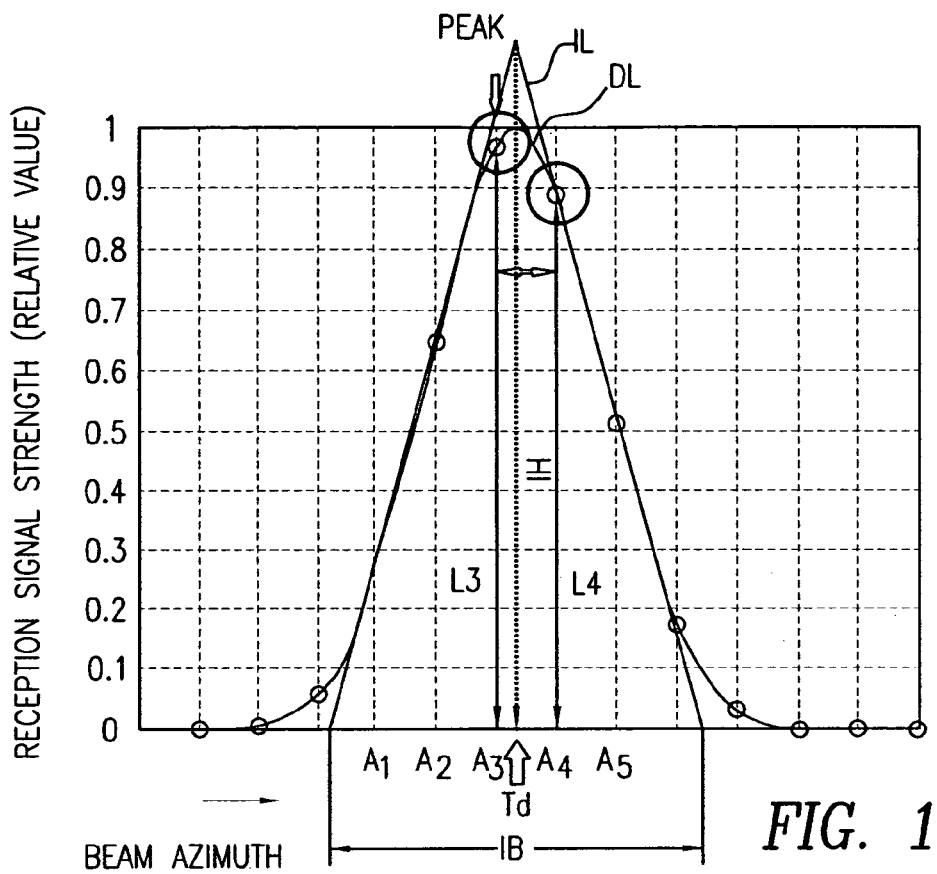
FIG. 11 illustrates a relationship between a reception signal strength distribution and an approximate isosceles triangle according to a third embodiment.

FIG. 11 illustrates an example of the distribution, in the beam azimuth direction, of reception signal strengths of an upbeat signal or a downbeat signal at a predetermined distance. The horizontal axis represents the beam central azimuth and particularly shows the range where the reception signal strength distribution curve is bell-shaped. The reception signal strength at each beam azimuth is the same as in the case of FIG. 7.

In the first and second embodiments described above, in the reception signal strength distribution, the central azimuth of the target is detected on the basis of the beam azimuth width and reception signal strengths at two azimuths that are separated, by a central-azimuth-detecting azimuth width, to the left and right of an azimuth corresponding to a maximum value. However, in the third embodiment, the central azimuth of the target is detected on the basis of a reception signal strength at an azimuth corresponding to a maximum value; a higher reception signal strength of two reception signal strengths corresponding to two azimuths on the left and right of the azimuth corresponding to the maximum value, the two azimuths each being separated by the central-azimuth-detecting azimuth width, from the azimuth corresponding to the maximum value; and the beam azimuth width. In other words, in the example shown in FIG. 11, of reception signal strengths corresponding to two azimuths A2 and A4 adjacent to a peak azimuth A3, the larger reception signal strength L4 corresponding to the azimuths A4, and a reception signal strength L3 corresponding to the peak azimuth A3 are extracted. Then, a central azimuth Td of an approximate isosceles triangle IL is calculated as the central azimuth of the target using the following equation:

$$Td=A3+IB/2-\{(IB-A4+A3)L3\}/(L3+L4) \qquad (3)$$

Equation (3) can be derived in the same manner as for Equation (1).

Next, a radar system of the fourth embodiment will be described with reference to FIG. 12 and FIG. 13.

In the first to third embodiments described above, the azimuth width determined by the beam azimuth width is defined as the base of the approximate isosceles triangle. However, in the fourth embodiment, the vertex azimuth of the approximate isosceles triangle is determined on the basis of points on two oblique sides of the approximate isosceles triangle and detected as the central azimuth of the target.

Figure 13:
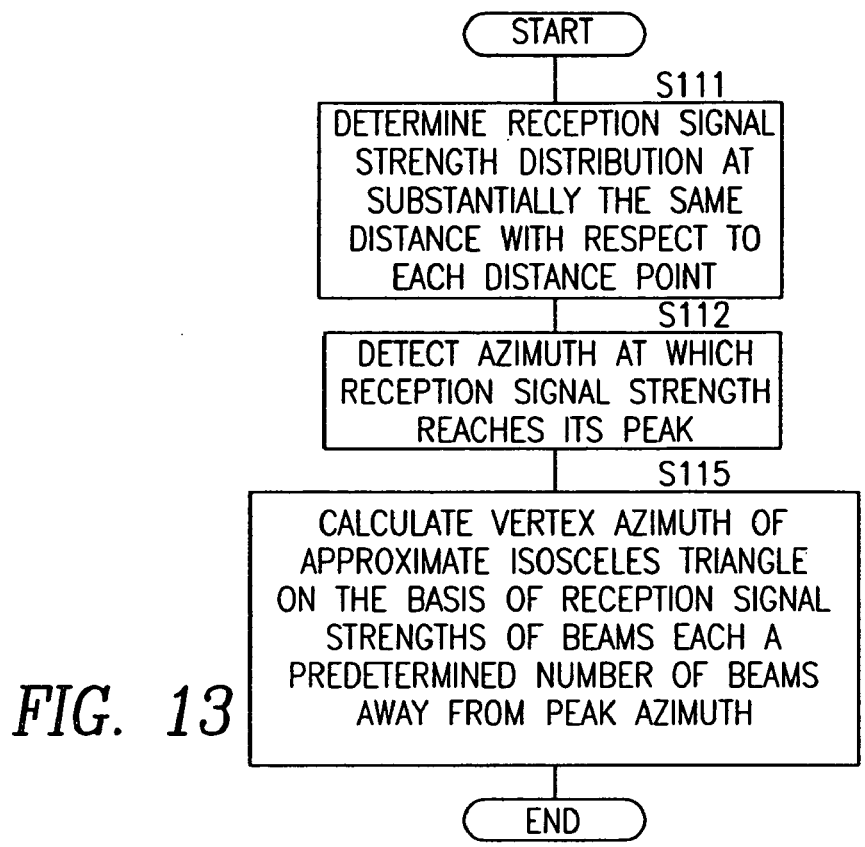
FIG. 13 is a flowchart showing a procedure of the target-central-azimuth detection.

FIG. 13 is a flowchart showing a processing procedure in step S10 in FIG. 5 of the first embodiment. First, with respect to each distance within the detectable distance range, the reception signal strength distribution at substantially the same distance is determined (S111). Then, for each distance, the azimuth A3 at which the reception signal strength reaches its peak is detected (S112). Next, reception signal strengths L1, L2, L3, and L4 at four beams adjacent in the azimuth direction are determined. Then, the vertex azimuth of an approximate isosceles triangle that has four points representing the reception signal strengths L1, L2, L3, and L4 on its two oblique sides is determined as the central azimuth Td of the target.

If A1=−2.0°, A2=−1.0°, A3=0°, A4=1.0°, A5=2.0°, L1=0.27, L2=0.65, L4=0.90, and L5=0.51 are given, and the vertical axis represents a reception signal strength L and the horizontal axis represents a beam azimuth "a", the straight oblique line on the left side of the approximate isosceles triangle IL is expressed as L=0.38a+1.02. Similarly, the straight oblique line on the right side of the approximate isosceles triangle IL is expressed as L=−0.39a+1.29. Thus, the azimuth "a" =0.34° corresponding to the vertex of the approximate isosceles triangle IL at which these two straight oblique lines intersect is given and the central azimuth 0.34° of the target is obtained.

Figure 12:
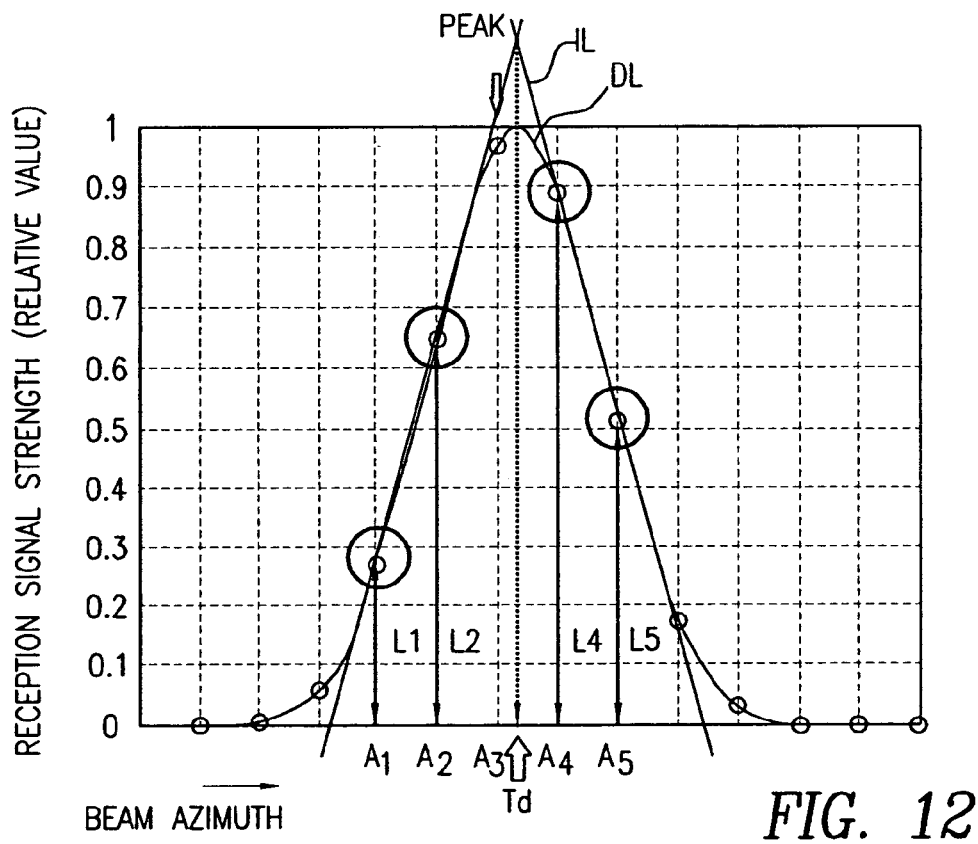
FIG. 12 illustrates a target-central-azimuth detection method of a radar system according to a fourth embodiment.

In the example illustrated in FIG. 12, the reception signal strength is extracted with respect to each of the beam azimuths A2, A1, A4, and A5 that are adjacent, with the peak azimuth A3 centered, in this order along the azimuth direction. However, the combination of beam azimuths corresponding to points on the two oblique lines of the approximate isosceles triangle is not limited to this. For example, two points corresponding to the second and third beams from the peak azimuth, or two points corresponding to the first and third beams from the peak azimuth may be extracted. On the basis of the reception signal strengths obtained at a plurality of arbitrary beam azimuths ranging from the first to the n-th beam azimuths from the peak azimuth, approximate straight lines may be determined by a least-square method or the like. Then, an intersection point at which two approximate straight lines meet may be determined as the central azimuth of the target.

Next, a radar system of the fifth embodiment will be described with reference to FIG. 14.

In any of the first to fourth embodiments described above, an isosceles triangle is defined such that points corresponding to reception signal strengths at two or more beam azimuths are located on the two oblique sides, and then, the central azimuth Td corresponding to the vertex of the isosceles triangle is determined as the central azimuth of the target. However, in the sixth embodiment, only one oblique side of an isosceles triangle is used to determine the central azimuth Td corresponding to the vertex of the isosceles triangle as the central azimuth of the target.

Figure 14:
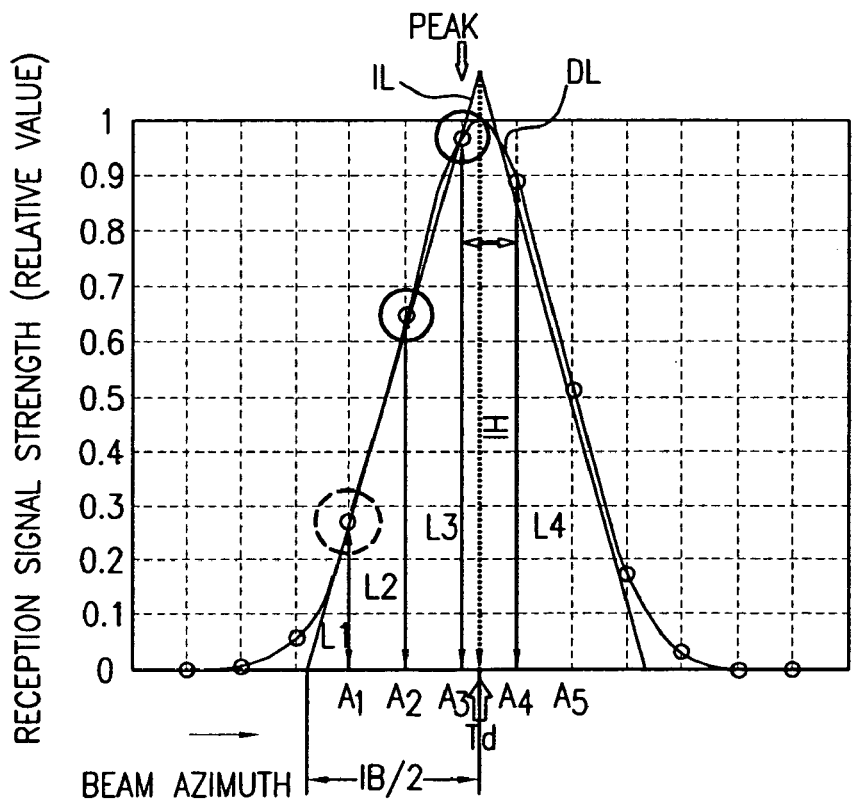
FIG. 14 illustrates a target-central-azimuth detecting method of a radar system according to a fifth embodiment.

In FIG. 14, a reception signal strength L3 at an azimuth A3 corresponding to a maximum value, a reception signal strength L4 at an azimuth A4 that is a central-azimuth-detecting azimuth width away to the right (in this example, immediately to the right) of the azimuth corresponding to the maximum value, and a reception signal strength L2 at an azimuth A2 that is a central-azimuth-detecting azimuth width away to the left (in this example, immediately to the left) of the azimuth corresponding to the maximum value are compared. Then, an isosceles triangle IL having a point corresponding to the lowest reception signal strength and a point corresponding to the highest reception signal strength that are located on one of its oblique sides and having a base (azimuth width) IB is determined.

Alternatively, by comparing the reception signal strength L4 at the azimuth A4 on the right of the azimuth corresponding to the maximum value and the reception signal strength L2 at the azimuth A2 on the left of the azimuth corresponding to the maximum value, a plurality of points arranged in the direction of a lower reception signal strength may be used. In the example shown in FIG. 14, a reception signal strength L1 at an azimuth A1 may also be used to define an isosceles triangle such that an approximate straight line that passes through a plurality of points representing the reception signal strengths L3, L2, and L1 forms one of the oblique sides of the isosceles triangle.

Next, a radar system of the sixth embodiment will be described with reference to FIG. 15.

Any of the first to fourth embodiments described above shows an example in which the central azimuth of the target exists within the detection azimuth range and in which a bell-shaped pattern appears in the reception signal strength distribution. However, if the central azimuth of the target is located at a farthest limit of the detection azimuth range or outside the farthest limit, only a part of the bell-shaped pattern generated by a reflected wave from the target appears in the reception signal strength distribution in the detection azimuth range. In the sixth embodiment, the central azimuth of the target is detected in response to such a case.

Specifically, when the reception signal strength distribution corresponding to changes in azimuth is expressed in rectangular coordinates, an azimuth corresponding to the vertex of an approximate isosceles triangle having a plurality of points representing reception signal strengths on one of its oblique sides and having an azimuth width defined by the beam azimuth width as its base is detected as the central azimuth of the target. In the example shown in FIG. 15, a vertex azimuth Td of an approximate isosceles triangle IL is detected as the central azimuth of the target, on the basis of a reception signal strength L3 at a beam azimuth A3 and a reception signal strength L4 at a beam azimuth A4.

If the beam azimuths A3=−10° and A4=−9° and their respective reception signal strengths L3=0.9 and L4=0.52 are given, the straight oblique line on the right side of the approximate isosceles triangle IL can be expressed as L=−0.38a−2.9. Substituting L=0 into this equation gives "a"=−7.6. If an azimuth width IB of 6.4° being the base of the approximate isosceles triangle IL is given, subtracting −7.6 from IB/2=3.2 gives −10.8° as the vertex azimuth Td of the approximate isosceles triangle IL. The target's central azimuth located outside the detection azimuth range can thus be detected, as the detection azimuth range is from −10° to +10° in this example.

Next, a radar system of the seventh embodiment will be described with reference to FIG. 16.

Figure 15:
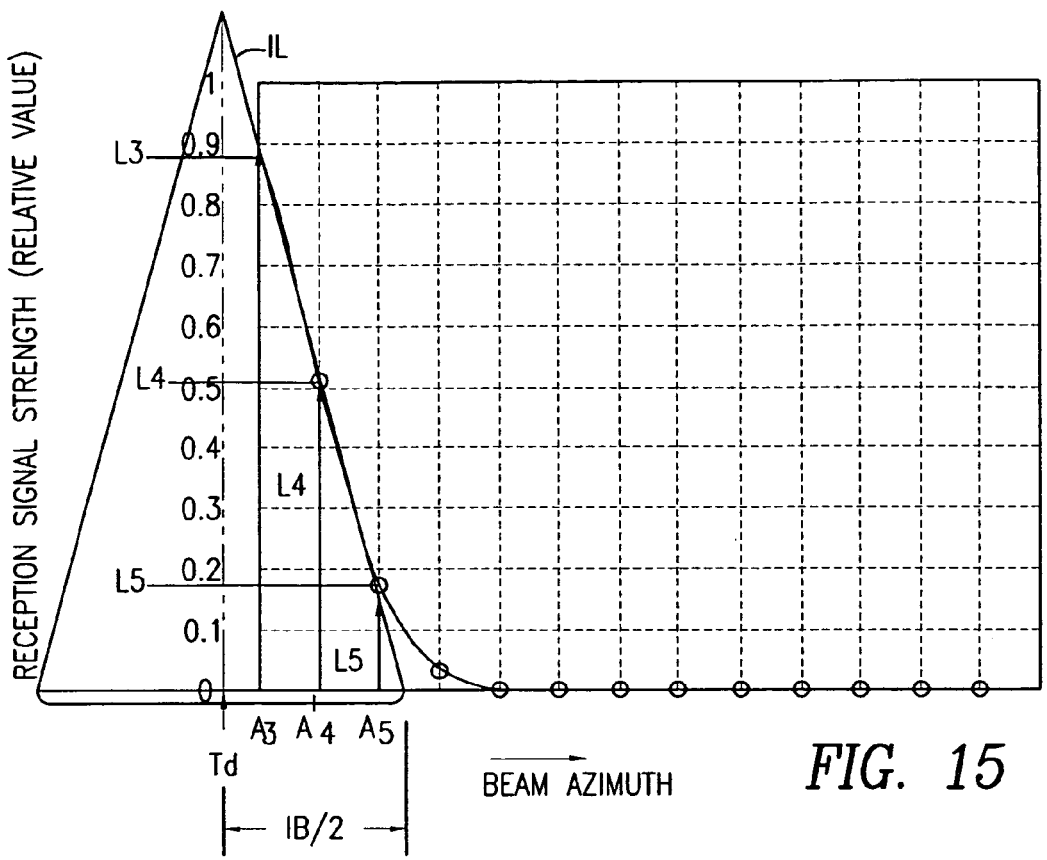
FIG. 15 illustrates a target-central-azimuth detecting method of a radar system according to a sixth embodiment.

In the example illustrated in FIG. 15, the central azimuth of the target is located outside the detection azimuth range. However, when an end of the detection azimuth range matches the peak azimuth, there is a case in which the central azimuth of the target is located within the detection azimuth range. FIG. 16 illustrates such a case. Specifically, a point representing a reception signal strength at a peak azimuth A3 and a point representing a reception signal strength at a beam azimuth A4 inside and adjacent to the peak azimuth A3 are located on their corresponding oblique sides of an isosceles triangle.

Figure 16:
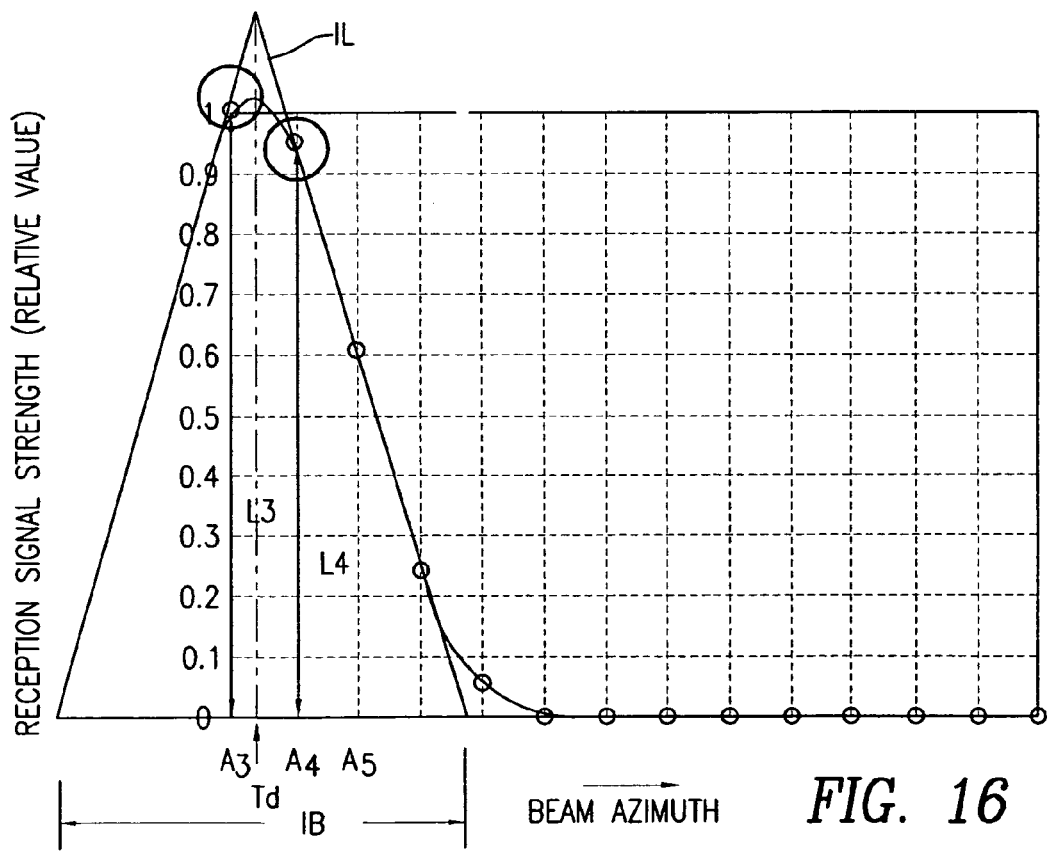
FIG. 16 illustrates a relationship between a reception signal strength distribution and an approximate isosceles triangle according to a seventh embodiment.

Referring to FIG. 16, in a right triangle with a height L3 on the left and a right triangle with a height L4 on the right, if the vertex azimuth of the approximate isosceles triangle is equal to A3, the base of the right triangle on the right is expressed as IB/2−(A4−A3) and the base of the right triangle on the left is expressed as IB/2. Since the two right triangles on the left and right are similar, the following relationship can be derived:

$$L4/L3 = \{IB/2-(A4-A3)\}/(IB/2) \tag{3}$$

Even if the vertex azimuth of the isosceles triangle deviates from A3, the similarity between the two right triangles is maintained. Therefore, a determination as to whether the azimuth A3 is located on the left oblique side of the approximate isosceles triangle, as in FIG. 16, can be made by checking whether the following inequality is satisfied:

$$L4/L3 > (IB/2-(A4-A3))/(IB/2) \tag{4}$$

If this inequality is satisfied, the central azimuth of the target is detected on the basis of Equation (3) as described in the third embodiment. If (4) is not satisfied, the central azimuth of the target is detected by the method described in the sixth embodiment.

Next, a radar system of the eighth embodiment will be described with reference to FIG. 17 and FIG. 18.

Figure 17:
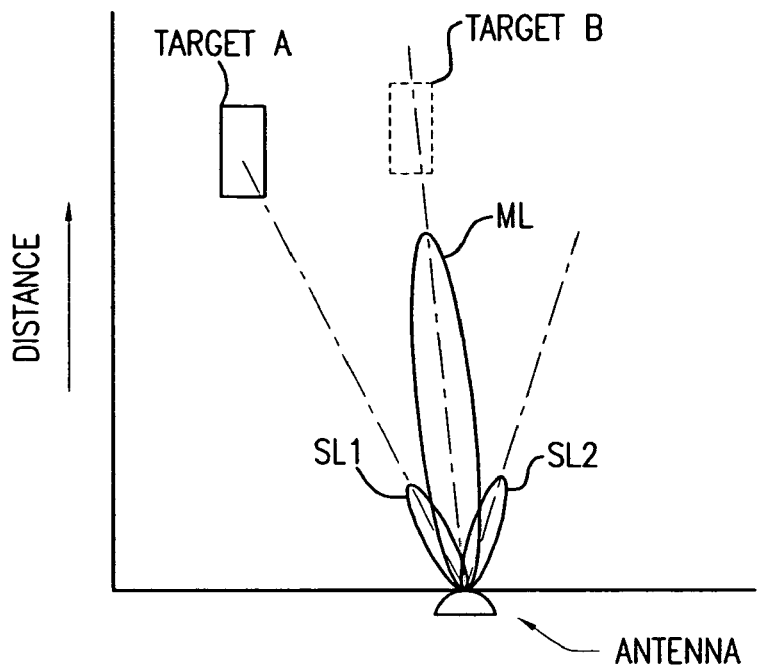
FIG. 17 illustrates the positional relationship of a main lobe, side lobes, and a target according to an eighth embodiment.

FIG. 17 illustrates, as viewed from the antenna of the radar system, the relationship of the azimuth and distance of each target, and a main lobe and side lobes of the antenna. The relationship between the lens antenna and primary radiator of the antenna determines the azimuth of a main lobe ML of the antenna. At the same time, side lobes SL1 and SL2 of the antenna appear in the directions different from that of the main lobe. FIG. 17 illustrates a state where, under conditions in which the main lobe ML can detect a target B if it exists (i.e., in the positional relationship in which the main lobe ML can receive a reflected wave from the target B), a beam is transmitted from the side lobe SL1 to a target A and a reflected wave from the target A is received.

Figure 18:
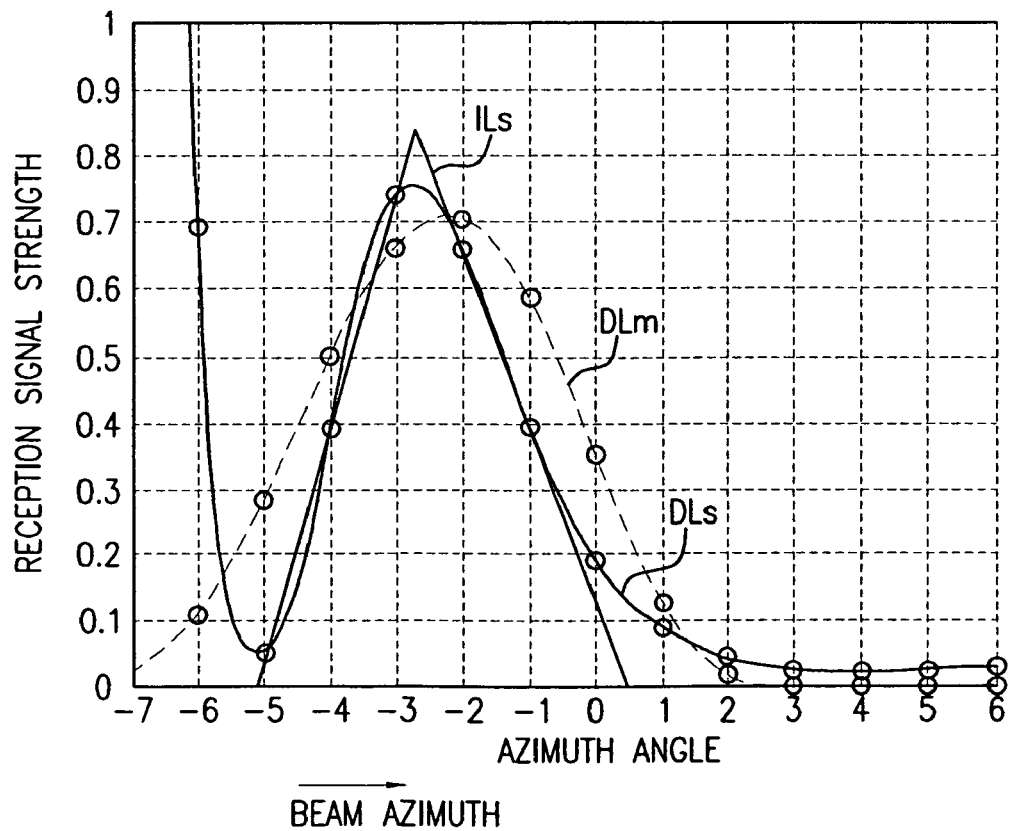
FIG. 18 illustrates a difference in the shape of reception signal strength distributions between a main lobe and a side lobe.

FIG. 18 shows superimposed curves representing the distribution of the strengths of signals received from the target A by the side lobe SL1 and the distribution of the strengths of signals received from the target B, if it exists, by the main lobe ML. Here, DLs represents a reception signal strength distribution generated from the target A located at a direction of −9°, while DLm represents a reception signal strength distribution generated from the target B, when it exist at a direction of −2°, and corresponding to the main lobe ML.

If the central azimuth of a target is calculated on the basis of a reception signal strength at each azimuth in the reception signal strength distribution DLs according to the fourth embodiment (method illustrated in FIG. 12), an vertex azimuth of −2.7° of an approximate isosceles triangle ILs is determined. However, this value differs considerably from the actual azimuth −9° of the target A.

As illustrated in FIG. 18, the beam azimuth width of the side lobe SL is smaller than that of the main lobe ML. Therefore, for the same azimuth width of the target, the base width (azimuth width) of an approximate isosceles triangle determined on the basis of the reception signal strength distribution for the side lobe is smaller than the base width of an approximate isosceles triangle determined on the basis of the reception signal strength distribution DLm for the main lobe. This relationship is used to avoid erroneous detection of the central azimuth of the target.

Specifically, when the reception signal strength distribution corresponding to changes in azimuth is expressed in rectangular coordinates, if the azimuth width of the base of an approximate isosceles triangle having a plurality of points representing reception signal strengths on its two oblique sides is determined and if the determined azimuth width is smaller than the azimuth width of the base of an approximate isosceles triangle based on the main lobe, the reception signal strength distribution used as a basis to determine the above-described approximate isosceles triangle is regarded as the reception signal strength distribution corresponding to a side lobe and thus, the vertex azimuth of this approximate isosceles triangle is not output as the central azimuth of the target.

Next, a radar system of the ninth embodiment will be described with reference to FIG. 19 to FIG. 23.

In the examples described in the first to eighth embodiments, a single target causes a single bell-shaped pattern to appear in a reception signal strength distribution. However, when a plurality of adjacent targets is located at substantially the same distance and in substantially the same azimuth direction from the radar system, processing for detecting the central azimuth has to be performed on each target. Such processing is performed in the ninth embodiment.

Figure 19:
FIG. 19 illustrates an example of the positional relationship of two targets with respect to a radar system according to a ninth embodiment.
Figure 20:
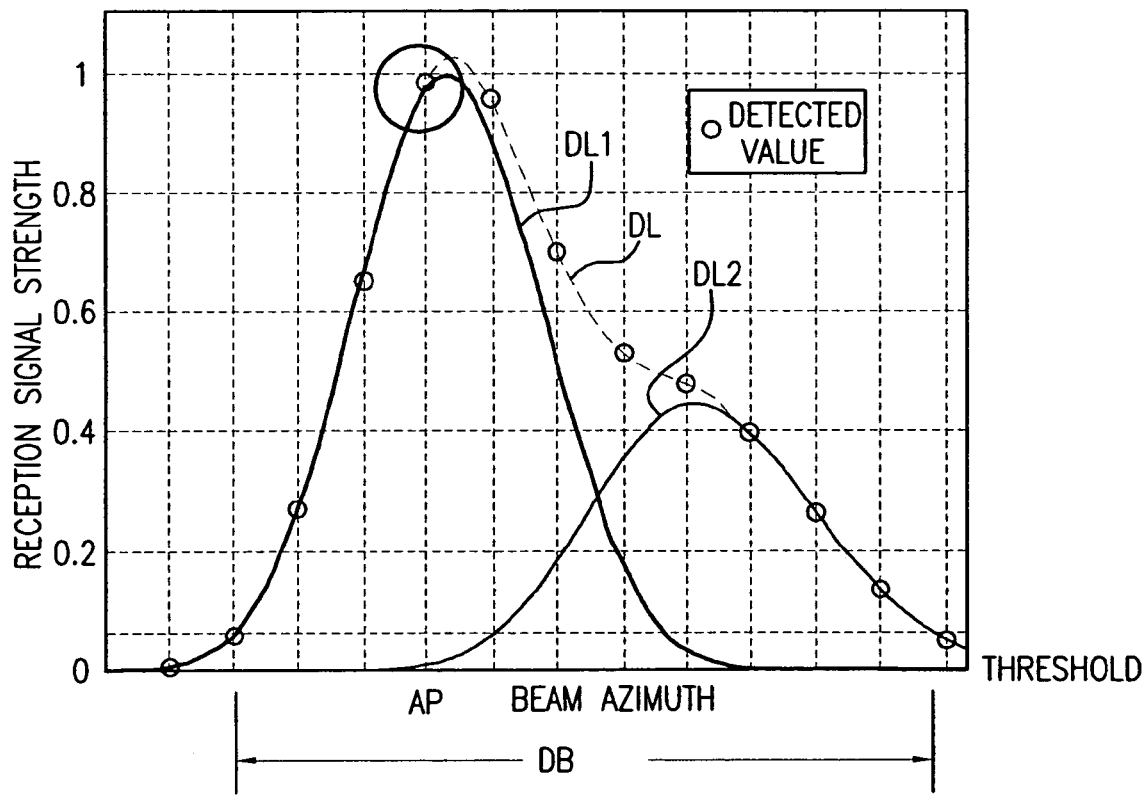
FIG. 20 illustrates an example of reception signal strength distributions obtained from the above-described relationship.

FIG. 19 illustrates the relationship between the radar system and two targets A and B in front of the radar system. FIG. 20 illustrates an exemplary reception signal strength distribution based on the relationship illustrated in FIG. 19. If only the target A shown in FIG. 19 exists, a reception signal strength distribution with a shape indicated by DL1 is obtained. If only the target B exists, a reception signal strength distribution with a shape indicated by DL2 is obtained. If both the targets A and B exist, a reception signal strength distribution having a modified bell shape with two slightly raised portions indicated by DL is obtained.

Figure 23:
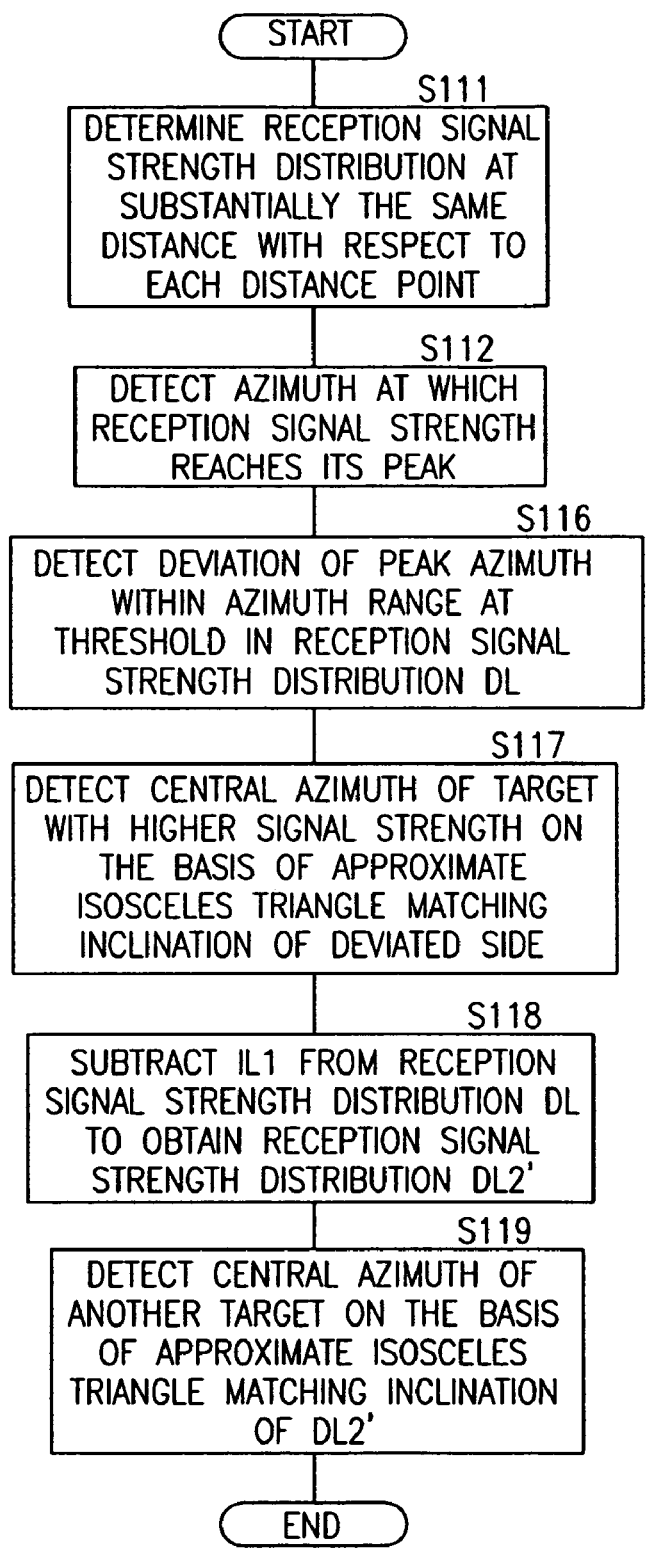
FIG. 23 illustrates a target-central-azimuth detecting method of the radar system.

FIG. 23 is a flowchart showing a processing procedure for detecting the central azimuth of a target by the radar system according to the ninth embodiment. First, for each distance within the detectable distance range, the reception signal strength distribution at substantially the same distance is determined (S111). Next, the azimuth at which the reception signal strength reaches its peak is detected for each distance (S112). Then, deviation of a peak azimuth within an azimuth range at a predetermined threshold in the reception signal strength distribution DL is detected (S116). In this example, as illustrated in FIG. 20, a peak azimuth Ap is deviated to the left of the center of an azimuth range DB at a predetermined threshold.

Figure 21:
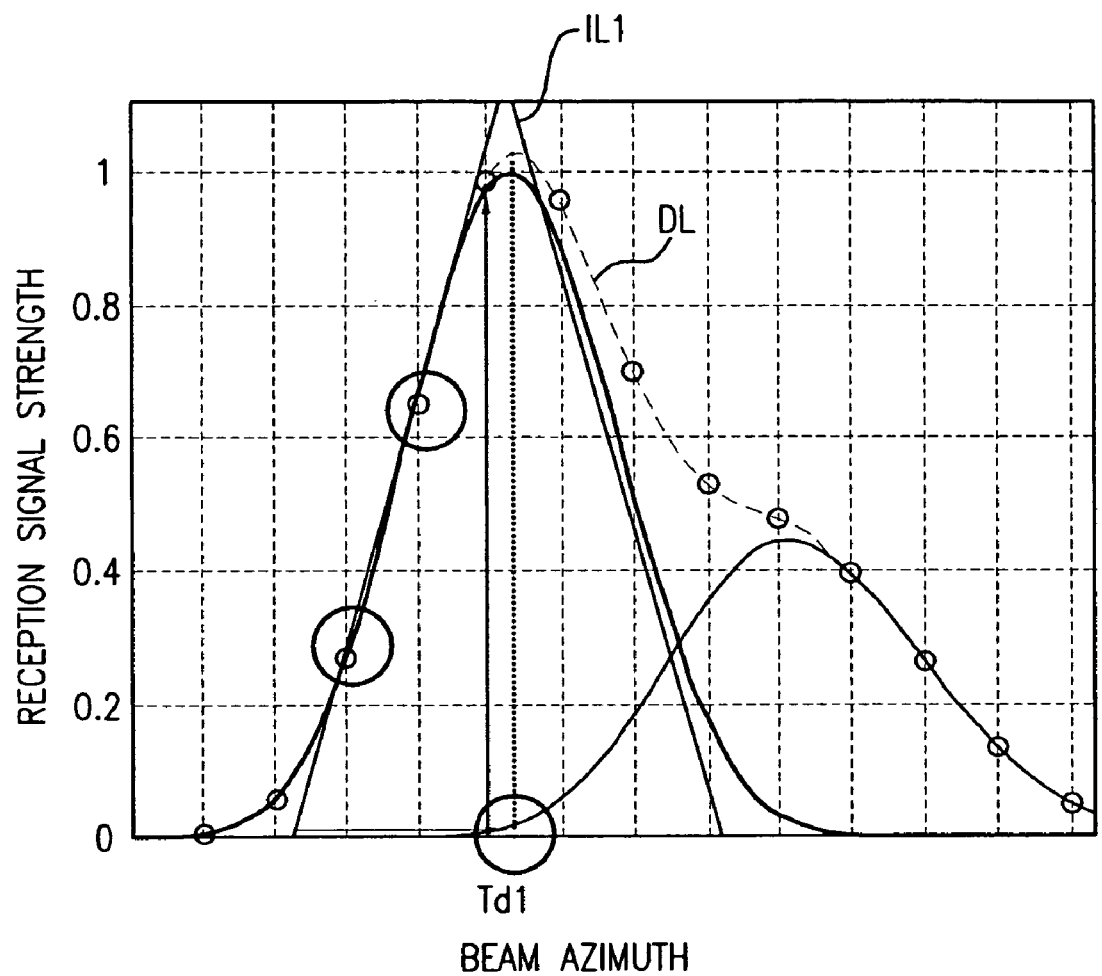
FIGS. 21(A) and 21(B) illustrate a method for detecting the central azimuth of one target.

Next, the central azimuth of one of the targets is detected on the basis of an isosceles triangle that matches an inclination of the reception signal strength distribution DL on the deviated side (S117). FIG. 21 illustrates this example. Here, an approximate isosceles triangle IL1 with a left oblique side that matches the inclination on the left side of the reception signal strength distribution DL is determined. The slope of this oblique side and an azimuth range (IB2/2) that is half the base of the approximate isosceles triangle IL1 determines a vertex azimuth Td1 of the approximate isosceles triangle. This azimuth Td1 is the azimuth of the target A illustrated in FIG. 19.

Figure 22:
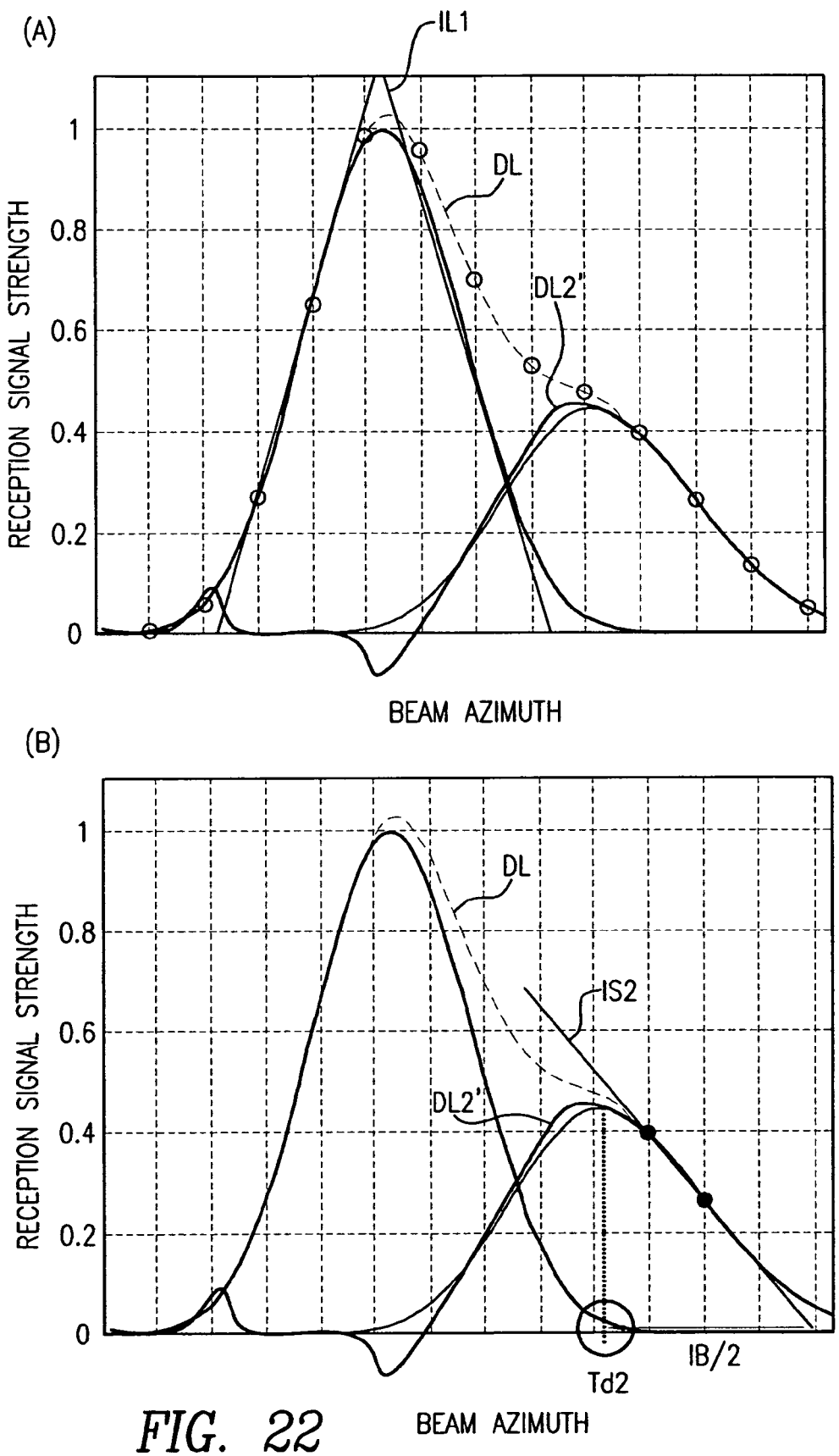
FIG. 22 illustrates a method for detecting the central azimuth of the other target.

Next, subtracting the distribution corresponding to the approximate isosceles triangle IL1 from the reception signal strength distribution DL gives a reception signal strength distribution generated from a reflected wave from the other target (S118). FIG. 22 (A) illustrates this example. Subtracting the distribution corresponding to the approximate isosceles triangle IL1 from the reception signal strength distribution DL gives another reception signal strength distribution DL2'. Since the reception signal strength distributions DL1 and DL2 for the targets A and B shown in FIG. 20 do not necessarily overlap in the same phase, the reception signal strength distribution DL actually obtained is not exactly equal to the sum of DL1 and DL2. However, roughly speaking, it is possible to treat the reception signal strength distribution DL as the sum of DL1 and DL2.

Next, the central azimuth of the other target is detected on the basis of an isosceles triangle that matches an inclination of the reception signal strength distribution DL2' (S119). FIG. 22 (B) illustrates this example. Specifically, first, an oblique side IS2 of an approximate isosceles triangle that matches an inclination of the newly obtained reception signal strength distribution DL2' is determined. Then, the slope of IS2 and half the azimuth width IB being the base of the approximate isosceles triangle determines a vertex azimuth Td2 of the approximate isosceles triangle as the central azimuth of the target.

The oblique side of this approximate isosceles triangle is matched with the inclination that is distant from the central azimuth Td1 of the target previously determined. This means that this oblique side is matched with a part of the original reception signal strength distribution DL. Therefore, since the effective shape of the reception signal strength distribution generated from a reflected wave from the target B is used, the central azimuth of the target B can be determined with a high degree of accuracy.

In the example described above, two adjacent targets are located at substantially the same distance and in substantially the same azimuth direction from the radar system. A similar method is applicable to the case where three or more adjacent targets are located at substantially the same distance and in substantially the same azimuth direction. Specifically, by repeating the steps S112 to S119 in the process shown in FIG. 23, a distribution for an approximate isosceles triangle corresponding to a target whose central azimuth is detected is sequentially subtracted from the reception signal strength distribution. The central azimuth of each of a plurality of targets is thus sequentially detected.

The invention claimed is:

1. A radar system comprising:
reception-signal-strength-distribution detector which transmits a beam of detection radio waves having a predetermined azimuth width extending from the left to the right of a predetermined azimuth at the center, receives a reflected wave from a target, changes a central azimuth of the beam, and detects the distribution of reception signal strengths at predetermined angular intervals and for each predetermined distance; and
target-central-azimuth detector which detects an azimuth corresponding to a vertex of an approximate isosceles triangle as a central azimuth of the target on the basis of a beam azimuth width and reception signal strengths at two azimuths that are a central-azimuth-detecting azimuth width away from each other and located on the left and right of an azimuth corresponding to a maximum value in the reception signal strength distribution within a distance to the target, the approximate isosceles triangle having the beam azimuth width as its base and having two points representing the reception signal strengths on its two oblique sides when the reception signal strength distribution associated with changes in azimuth is expressed in rectangular coordinates.

2. The radar system according to claim 1, wherein the target-central-azimuth detector further defines a plurality of central-azimuth-detecting azimuth widths, detects an azimuth corresponding to a vertex of an approximate isosceles triangle with respect to each of the central-azimuth-detected azimuth widths, and performs weighted averaging on the detected azimuths.

3. The radar system according to claim 2, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

4. The radar system according to claim 1, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

5. A radar system comprising:
reception-signal-strength-distribution detector which transmits a beam of detection radio waves having a predetermined azimuth width extending from the left to the right of a predetermined azimuth at the center, receiving a reflected wave from a target, changes a central azimuth of the beam, and detects the distribution of reception signal strengths at predetermined angular intervals and for each predetermined distance; and
target-central-azimuth detector which detects an azimuth corresponding to a vertex of an approximate isosceles triangle as a central azimuth of the target on the basis of a beam azimuth width, a reception signal strength at an azimuth corresponding to a maximum value in the reception signal strength distribution within a distance to the target, and a higher reception signal strength of two reception signal strengths at two azimuths that are respectively separated by a central-azimuth-detecting azimuth width to the left and right sides from the azimuth corresponding to the maximum value, the approximate isosceles triangle having the beam azimuth width as its base and having two points representing the reception signal strengths on its two oblique sides when the reception signal strength distribution associated with changes in azimuth is expressed in rectangular coordinates.

6. The radar system according to claim 5, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

7. A radar system comprising:
reception-signal-strength-distribution detector which transmits a beam of detection radio waves having a predetermined azimuth width extending from the left to the right of a predetermined azimuth at the center, receives a reflected wave from a target, changes a central azimuth of the beam, and detects the distribution of reception signal strengths at predetermined angular intervals and for each predetermined distance; and
target-central-azimuth detector which detects an azimuth corresponding to a vertex of an approximate isosceles triangle as a central azimuth of the target on the basis of reception signal strengths at a plurality of azimuths that are predetermined central-azimuth-detecting azimuth widths away from and are located on the left and right sides of an azimuth corresponding to a maximum value in the reception signal strength distribution within a distance to the target, the approximate isosceles triangle having a plurality of points representing the reception signal strengths at the plurality of azimuths on its two oblique sides when the reception signal strength distribution associated with changes in azimuth is expressed in rectangular coordinates.

8. The radar system according to claim 7, further comprising a processor that is programmed with software to determine if the length of the base of the approximate isosceles triangle is smaller than the beam azimuth width of a main lobe of the beam, and if this condition is true, to cause an azimuth corresponding to the vertex of the approximate isosceles triangle not to be treated as a central azimuth of the target.

9. A radar system comprising:
reception-signal-strength-distribution detector which transmits a beam of detection radio waves having a predetermined azimuth width extending from the left to the right of a predetermined azimuth at the center, receives a reflected wave from a target, changes a central azimuth of the beam, and detects the distribution of reception signal strengths at predetermined angular intervals and for each predetermined distance; and
target-central-azimuth detector which detects an azimuth corresponding to a vertex of an approximate isosceles triangle as a central azimuth of the target on the basis of a reception signal strength at an azimuth corresponding to a maximum value in the reception signal strength distribution within a distance to the target and also, on the basis of a lower reception signal strength of two reception signal strengths at two azimuths that are respectively separated by a central-azimuth-detecting azimuth width to the left and right sides from the azimuth corresponding to the maximum value or a plurality of reception signal strengths at a plurality of azimuths located on the same side as the azimuth corresponding to the lower reception signal strength, the approximate isosceles triangle having a plurality of points representing the reception signal strengths on one of its oblique sides and having the beam azimuth width as its base, when the reception signal strength distribution associated with changes in azimuth is expressed in rectangular coordinates.

10. The radar system according to claim 9, further comprising reception-signal-strength-distribution corrector which subtracts, if the reception signal strength distribution within a distance to the target extends further than the beam azimuth width in the azimuth direction, a distribution corresponding to the isosceles triangle having the azimuth of the target detected by the target-central-azimuth detecting means as its vertex and having the beam azimuth width as its base from the reception signal strength distribution.

11. The radar system according to claim 10, wherein the reception-signal-strength-distribution corrector sequentially subtracts a distribution for the isosceles triangle corresponding to a target whose central azimuth is detected from the reception signal strength distribution.

12. The radar system according to claim 9, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

13. A radar system comprising:
reception-signal-strength-distribution detector which transmits a beam of detection radio waves having a predetermined azimuth width extending from the left to the right of a predetermined azimuth at the center, receives a reflected wave from a target, changes a central azimuth of the beam, and detects the distribution of reception signal strengths at predetermined angular intervals and for each predetermined distance; and
target-central-azimuth detector which detects an azimuth corresponding to a vertex of an approximate isosceles triangle as a central azimuth of the target on the basis of a reception signal strength at an azimuth corresponding to a maximum value in the reception signal strength distribution within a distance to the target and one or a plurality of reception signal strengths at one or a plurality of azimuths that are one or a plurality of centralazimuth-detecting azimuth widths inside, left or right, the azimuth corresponding to the maximum value, the approximate isosceles triangle having a plurality of points representing the reception signal strengths on one of its oblique sides and having the beam azimuth width as its base when the reception signal strength distribution associated with changes in azimuth is expressed in rectangular coordinates.

14. The radar system according to claim 13, further comprising reception-signal-strength-distribution corrector which subtracts, if the reception signal strength distribution within a distance to the target extends further than the beam azimuth width in the azimuth direction, a distribution corresponding to the isosceles triangle having the azimuth of the target detected by the target-central-azimuth detecting means as its vertex and having the beam azimuth width as its base from the reception signal strength distribution.

15. The radar system according to claim 14, wherein the reception-signal-strength-distribution corrector sequentially subtracts a distribution for the isosceles triangle corresponding to a target whose central azimuth is detected from the reception signal strength distribution.

16. The radar system according to claim 14, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

17. The radar system according to claim 16, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

18. The radar system according to claim 13, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

19. A radar system comprising:
reception-signal-strength-distribution detector which transmits a beam of detection radio waves having a predetermined azimuth width extending from the left to the right of a predetermined azimuth at the center, receives a reflected wave from a target, changes a central azimuth of the beam, and detects the distribution of reception signal strengths at predetermined angular intervals and for each predetermined distance; and target-central-azimuth detector which detects an azimuth corresponding to a vertex of an approximate isosceles triangle as a central azimuth of the target, if an azimuth at which a reception signal reaches its maximum value is located at an end, left or right, of a detection azimuth angle range, and if a first condition that the ratio of an azimuth width obtained by subtracting a central-azimuth-detecting azimuth width from half the beam azimuth width to half the beam azimuth width is smaller than the ratio of a reception signal strength at an azimuth that is a central-azimuth-detecting azimuth width inside, left or right, an outermost azimuth corresponding to a maximum value in the reception signal strength distribution within a distance to the target to the outermost azimuth corresponding to the maximum value is satisfied, on the basis of the signal strength at the outermost azimuth corresponding to the maximum value, the reception signal strength at the azimuth that is a central-azimuth-detecting azimuth width inside the outermost azimuth, and the beam azimuth width, the approximate isosceles triangle having the beam azimuth width as its base and having two points representing the reception signal strengths on its two oblique sides when the reception signal strength distribution associated with changes in azimuth is expressed in rectangular coordinates, and if the first condition is not satisfied, on the basis of a reception signal strength at an azimuth corresponding to a maximum value in the reception signal strength distribution within a distance to the target and one or a plurality of reception signal strengths at one or a plurality of azimuths that are one or a plurality of central-azimuth-detecting azimuth widths inside, left or right, the azimuth corresponding to the maximum value, the approximate isosceles triangle having a plurality of points representing the reception signal strengths on one of its oblique sides and having the beam azimuth width as its base when the reception signal strength distribution associated with changes in azimuth is expressed in rectangular coordinates.

20. The radar system according to claim 19, wherein the reception-signal-strength-distribution detector varies the central azimuth of the beam within a detection azimuth angle range, and the target-central-azimuth detector further varies the central-azimuth-detecting azimuth width according to an azimuth corresponding to a maximum value in the reception signal strength distribution within a distance to the target.

* * * * *